(12) United States Patent
Nguyen

(10) Patent No.: US 10,537,808 B2
(45) Date of Patent: *Jan. 21, 2020

(54) CONTROL OF MOBILE GAME PLAY ON A MOBILE VEHICLE

(71) Applicant: Nguyen Gaming LLC, Reno, NV (US)

(72) Inventor: Binh T. Nguyen, Reno, NV (US)

(73) Assignee: Nguyem Gaming LLC, Reno, NV (US)

(*) Notice: Subject to any disclaimer, the term of this patent is extended or adjusted under 35 U.S.C. 154(b) by 40 days.

This patent is subject to a terminal disclaimer.

(21) Appl. No.: 15/426,898

(22) Filed: Feb. 7, 2017

(65) Prior Publication Data
US 2017/0144071 A1 May 25, 2017

Related U.S. Application Data

(63) Continuation of application No. 13/632,828, filed on Oct. 1, 2012, now Pat. No. 9,630,096.
(Continued)

(51) Int. Cl.
A63F 13/216 (2014.01)
A63F 13/73 (2014.01)
(Continued)

(52) U.S. Cl.
CPC .............. A63F 13/73 (2014.09); A63F 13/12 (2013.01); A63F 13/216 (2014.09); A63F 13/25 (2014.09); A63F 13/35 (2014.09); A63F 13/92 (2014.09); H04L 67/38 (2013.01); H04W 4/023 (2013.01); H04W 4/029 (2018.02); H04W 4/42 (2018.02); H04W 12/00 (2013.01); H04W 12/06 (2013.01);
(Continued)

(58) Field of Classification Search
CPC ............ G07F 17/3218; G07F 17/3251; G07Q 20/123
USPC ...................................................... 463/40–42
See application file for complete search history.

(56) References Cited

U.S. PATENT DOCUMENTS 2,033,638 A 3/1936 Koppl
2,062,923 A 12/1936 Nagy
(Continued)

FOREIGN PATENT DOCUMENTS

GB 2033638 5/1980
GB 2062923 5/1981
(Continued)

OTHER PUBLICATIONS

Benston, Liz, "Harrahs Launches iPhone App; Caesars Bypasses Check-in," Las Vegas Sun, Las Vegas, NV. Jan. 8, 2010.
(Continued)

Primary Examiner — Omkar A Deodhar
Assistant Examiner — Ross A Williams

(57) ABSTRACT

In one embodiment, a system and method for controlling mobile gaming on a vessel may have a plurality of mobile gaming devices, a location server operable to track a device position of each of the plurality of mobile gaming devices and track a vessel position of the vessel, and a mobile gaming management server configured to communicate with the location server and a gaming server, the mobile gaming management server operable to individually control whether each of the plurality of mobile gaming devices is permitted to play a game of chance based on the device position and the vessel position.

25 Claims, 8 Drawing Sheets

Related U.S. Application Data

(60) Provisional application No. 61/542,705, filed on Oct. 3, 2011.

(51) Int. Cl.

| | | |
|---|---|---|
| *H04W 4/029* | (2018.01) | |
| *H04W 4/42* | (2018.01) | |
| *A63F 13/30* | (2014.01) | |
| *H04L 29/06* | (2006.01) | |
| *H04W 12/00* | (2009.01) | |
| *A63F 13/25* | (2014.01) | |
| *A63F 13/35* | (2014.01) | |
| *A63F 13/92* | (2014.01) | |
| *H04W 4/02* | (2018.01) | |
| *H04W 12/06* | (2009.01) | |
| *H04L 29/08* | (2006.01) | |

(52) U.S. Cl.
CPC ... *A63F 2300/405* (2013.01); *A63F 2300/406* (2013.01); *A63F 2300/516* (2013.01); *H04L 67/12* (2013.01); *H04W 12/00502* (2019.01); *H04W 12/00503* (2019.01)

(56) References Cited

U.S. PATENT DOCUMENTS

| | | |
|---|---|---|
| 4,741,539 A | 5/1988 | Sutton et al. |
| 4,948,138 A | 8/1990 | Pease et al. |
| 5,067,712 A | 11/1991 | Georgilas |
| 5,429,361 A | 7/1995 | Raven et al. |
| 5,489,103 A | 2/1996 | Okamoto |
| 5,630,757 A | 5/1997 | Gagin |
| 5,655,961 A | 8/1997 | Acres et al. |
| 5,704,835 A | 1/1998 | Dietz, II |
| 5,727,786 A | 3/1998 | Weingardt |
| 5,833,537 A | 11/1998 | Barrie |
| 5,842,921 A | 12/1998 | Mindes |
| 5,919,091 A | 7/1999 | Bell et al. |
| 5,947,820 A | 9/1999 | Morro et al. |
| 5,997,401 A | 12/1999 | Crawford |
| 6,001,016 A | 12/1999 | Walker et al. |
| 6,039,648 A | 3/2000 | Guinn et al. |
| 6,059,289 A | 5/2000 | Vancura |
| 6,089,977 A | 7/2000 | Bennett |
| 6,095,920 A | 8/2000 | Sudahiro |
| 6,110,041 A | 8/2000 | Walker et al. |
| 6,142,872 A | 11/2000 | Walker et al. |
| 6,146,273 A | 11/2000 | Olsen |
| 6,165,071 A | 12/2000 | Weiss |
| 6,231,445 B1 | 5/2001 | Acres |
| 6,270,412 B1 | 8/2001 | Crawford et al. |
| 6,290,600 B1 | 9/2001 | Glasson |
| 6,293,866 B1 | 9/2001 | Walker et al. |
| 6,353,390 B1 | 3/2002 | Beri et al. |
| 6,364,768 B1 | 4/2002 | Acres et al. |
| 6,404,884 B1 | 6/2002 | Marwell et al. |
| 6,416,406 B1 | 7/2002 | Duhamel |
| 6,416,409 B1 | 7/2002 | Jordan |
| 6,443,452 B1 | 9/2002 | Brune |
| 6,491,584 B2 | 12/2002 | Graham et al. |
| 6,505,095 B1 | 1/2003 | Kolls |
| 6,508,710 B1 | 1/2003 | Paravia et al. |
| 6,561,900 B1 | 5/2003 | Baerlocker et al. |
| 6,592,457 B1 | 7/2003 | Frohm et al. |
| 6,612,574 B1 | 9/2003 | Cole et al. |
| 6,620,046 B2 | 9/2003 | Rowe |
| 6,641,477 B1 | 11/2003 | Dietz, II |
| 6,645,078 B1 | 11/2003 | Mattice |
| 6,719,630 B1 | 4/2004 | Seelig et al. |
| 6,749,510 B2 | 6/2004 | Globbi |
| 6,758,757 B2 | 7/2004 | Luciano, Jr. et al. |
| 6,773,345 B2 | 8/2004 | Walker et al. |
| 6,778,820 B2 | 8/2004 | Tendler |
| 6,780,111 B2 | 8/2004 | Cannon et al. |
| 6,799,032 B2 | 9/2004 | McDonnell et al. |
| 6,800,027 B2 | 10/2004 | Giobbi et al. |
| 6,804,763 B1 | 10/2004 | Stockdale et al. |
| 6,811,486 B1 | 11/2004 | Luciano, Jr. |
| 6,843,725 B2 | 1/2005 | Nelson |
| 6,846,238 B2 | 1/2005 | Wells |
| 6,848,995 B1 | 2/2005 | Walker et al. |
| 6,852,029 B2 | 2/2005 | Baltz et al. |
| 6,869,361 B2 | 3/2005 | Sharpless et al. |
| 6,875,106 B2 | 4/2005 | Weiss et al. |
| 6,884,170 B2 | 4/2005 | Rowe |
| 6,884,172 B1 | 4/2005 | Lloyd et al. |
| 6,902,484 B2 | 6/2005 | Idaka |
| 6,908,390 B2 | 6/2005 | Nguyen et al. |
| 6,913,532 B2 | 7/2005 | Bearlocher et al. |
| 6,923,721 B2 | 8/2005 | Luciano et al. |
| 6,935,958 B2 | 8/2005 | Nelson |
| 6,949,022 B1 | 9/2005 | Showers |
| 6,955,600 B2 | 10/2005 | Glavich et al. |
| 6,971,956 B2 | 12/2005 | Rowe et al. |
| 6,984,174 B2 | 1/2006 | Cannon et al. |
| 6,997,803 B2 | 2/2006 | LeMay et al. |
| 7,018,292 B2 | 3/2006 | Tracy et al. |
| 7,032,115 B2 | 4/2006 | Kashani |
| 7,033,276 B2 | 4/2006 | Walker et al. |
| 7,035,626 B1 | 4/2006 | Luciano |
| 7,037,195 B2 | 5/2006 | Schneider et al. |
| 7,048,628 B2 | 5/2006 | Schneider |
| 7,048,630 B2 | 5/2006 | Berg et al. |
| 7,063,617 B2 | 6/2006 | Brosnan et al. |
| 7,076,329 B1 | 7/2006 | Kolls |
| 7,089,264 B1 | 8/2006 | Guido et al. |
| 7,094,148 B2 | 8/2006 | Bearlocher et al. |
| 7,105,736 B2 | 9/2006 | Laakso |
| 7,111,141 B2 | 9/2006 | Nelson |
| 7,144,321 B2 | 12/2006 | Mayeroff |
| 7,152,783 B2 | 12/2006 | Charrin |
| 7,169,041 B2 | 1/2007 | Tessmer et al. |
| 7,169,052 B2 | 1/2007 | Beaulieu et al. |
| 7,175,523 B2 | 2/2007 | Gilmore et al. |
| 7,181,228 B2 | 2/2007 | Boesch |
| 7,182,690 B2 | 2/2007 | Giobbi et al. |
| RE39,644 E | 5/2007 | Alcorn et al. |
| 7,217,191 B2 | 5/2007 | Allen et al. |
| 7,243,104 B2 | 7/2007 | Bill |
| 7,247,098 B1 | 7/2007 | Bradford et al. |
| 7,259,718 B2 | 8/2007 | Patterson et al. |
| 7,275,989 B2 | 10/2007 | Moody |
| 7,285,047 B2 | 10/2007 | Gielb et al. |
| 7,311,608 B1 | 12/2007 | Danieli |
| 7,314,408 B2 | 1/2008 | Cannon et al. |
| 7,316,615 B2 | 1/2008 | Soltys et al. |
| 7,316,619 B2 | 1/2008 | Nelson |
| 7,318,775 B2 | 1/2008 | Brosnan et al. |
| 7,326,116 B2 | 2/2008 | O'Donovan et al. |
| 7,330,108 B2 | 2/2008 | Thomas |
| 7,346,358 B2 | 3/2008 | Wood et al. |
| 7,355,112 B2 | 4/2008 | Laakso |
| 7,384,338 B2 | 6/2008 | Rothschild et al. |
| 7,387,571 B2 | 6/2008 | Walker et al. |
| 7,393,278 B2 | 7/2008 | Gerson et al. |
| 7,396,990 B2 | 7/2008 | Lu et al. |
| 7,415,426 B2 | 8/2008 | Williams et al. |
| 7,425,177 B2 | 9/2008 | Rodgers et al. |
| 7,427,234 B2 | 9/2008 | Soltys et al. |
| 7,427,236 B2 | 9/2008 | Kaminkow et al. |
| 7,427,708 B2 | 9/2008 | Ohmura |
| 7,431,650 B2 | 10/2008 | Kessman |
| 7,448,949 B2 | 11/2008 | Kaminkow et al. |
| 7,500,913 B2 | 3/2009 | Baerlocher |
| 7,510,474 B2 | 3/2009 | Carter |
| 7,513,828 B2 | 4/2009 | Nguyen et al. |
| 7,519,838 B1 | 4/2009 | Suurballe |
| 7,559,838 B2 | 7/2009 | Walker et al. |
| 7,563,167 B2 | 7/2009 | Walker et al. |
| 7,572,183 B2 | 8/2009 | Olivas et al. |
| 7,585,222 B2 | 9/2009 | Muir |
| 7,602,298 B2 | 10/2009 | Thomas |
| 7,607,174 B1 | 10/2009 | Kashchenko et al. |

(56) References Cited

U.S. PATENT DOCUMENTS

| | | |
|---|---|---|
| 7,611,409 B2 | 11/2009 | Muir et al. |
| 7,637,810 B2 | 12/2009 | Amaitis et al. |
| 7,644,861 B2 | 1/2010 | Alderucci et al. |
| 7,653,757 B1 | 1/2010 | Fernald et al. |
| 7,693,306 B2 | 4/2010 | Huber |
| 7,699,703 B2 | 4/2010 | Muir et al. |
| 7,722,453 B2 | 5/2010 | Lark et al. |
| 7,758,423 B2 | 7/2010 | Foster et al. |
| 7,771,271 B2 | 8/2010 | Walker et al. |
| 7,780,529 B2 | 8/2010 | Rowe et al. |
| 7,780,531 B2 | 8/2010 | Englman et al. |
| 7,785,192 B2 | 8/2010 | Canterbury et al. |
| 7,811,172 B2 | 10/2010 | Asher et al. |
| 7,819,749 B1 | 10/2010 | Fish |
| 7,822,688 B2 | 10/2010 | Labron |
| 7,828,652 B2 | 11/2010 | Nguyen et al. |
| 7,828,654 B2 | 11/2010 | Carter |
| 7,828,661 B1 | 11/2010 | Fish |
| 7,850,528 B2 | 12/2010 | Wells |
| 7,874,919 B2 | 1/2011 | Paulsen et al. |
| 7,877,798 B2 | 1/2011 | Saunders et al. |
| 7,883,413 B2 | 2/2011 | Paulsen |
| 7,892,097 B2 | 2/2011 | Muir et al. |
| 7,909,692 B2 | 3/2011 | Nguyen et al. |
| 7,909,699 B2 | 3/2011 | Parrott et al. |
| 7,918,728 B2 | 4/2011 | Nguyen et al. |
| 7,927,211 B2 | 4/2011 | Rowe et al. |
| 7,927,212 B2 | 4/2011 | Hedrick et al. |
| 7,951,008 B2 | 5/2011 | Wolf et al. |
| 8,057,298 B2 | 11/2011 | Nguyen et al. |
| 8,057,303 B2 | 11/2011 | Rasmussen |
| 8,087,988 B2 | 1/2012 | Nguyen et al. |
| 8,117,608 B1 | 2/2012 | Slettehaugh |
| 8,133,113 B2 | 3/2012 | Nguyen |
| 8,182,326 B2 | 5/2012 | Speers et al. |
| 8,210,927 B2 | 7/2012 | Hedrick |
| 8,221,245 B2 | 7/2012 | Walker |
| 8,226,459 B2 | 7/2012 | Barrett |
| 8,226,474 B2 | 7/2012 | Nguyen et al. |
| 8,231,456 B2 | 7/2012 | Zielinski |
| 8,235,803 B2 | 8/2012 | Loose et al. |
| 8,282,475 B2 | 10/2012 | Nguyen et al. |
| 8,323,099 B2 | 12/2012 | Durham et al. |
| 8,337,290 B2 | 12/2012 | Nguyen et al. |
| 8,342,946 B2 | 1/2013 | Amaitis |
| 8,393,948 B2 | 3/2013 | Allen et al. |
| 8,403,758 B2 | 3/2013 | Homik |
| 8,430,745 B2 | 4/2013 | Agarwal et al. |
| 8,461,958 B2 | 6/2013 | Saenz |
| 8,469,813 B2 | 6/2013 | Joshi |
| 8,529,345 B2 | 9/2013 | Nguyen |
| 8,597,108 B2 | 12/2013 | Nguyen |
| 8,602,875 B2 | 12/2013 | Nguyen |
| 8,613,655 B2 | 12/2013 | Kisenwether |
| 8,613,659 B2 | 12/2013 | Nelson et al. |
| 8,696,470 B2 | 4/2014 | Nguyen |
| 8,745,417 B2 | 6/2014 | Huang et al. |
| 8,858,323 B2 | 10/2014 | Nguyen et al. |
| 8,864,586 B2 | 10/2014 | Nguyen |
| 8,942,995 B1 | 1/2015 | Kerr |
| 9,039,507 B2 | 5/2015 | Allen et al. |
| 9,235,952 B2 | 1/2016 | Nguyen |
| 9,292,996 B2 | 3/2016 | Davis et al. |
| 9,325,203 B2 | 4/2016 | Nguyen |
| 9,466,171 B2 | 10/2016 | Hornik |
| 9,483,901 B2 | 11/2016 | Nguyen |
| 9,486,697 B2 | 11/2016 | Chung |
| 9,486,704 B2 | 11/2016 | Chung |
| 9,576,425 B2 | 2/2017 | Nguyen |
| 9,626,826 B2 | 4/2017 | Nguyen |
| 9,666,021 B2 | 5/2017 | Nguyen |
| 9,672,686 B2 | 6/2017 | Nguyen |
| 9,741,205 B2 | 8/2017 | Nguyen |
| 9,811,973 B2 | 11/2017 | Nguyen |
| 9,814,970 B2 | 11/2017 | Nguyen |
| 9,842,462 B2 | 12/2017 | Nguyen |
| 9,875,606 B2 | 1/2018 | Nguyen |
| 9,875,609 B2 | 1/2018 | Nguyen |
| 9,981,180 B2 | 5/2018 | Koyanagi et al. |
| 10,140,816 B2 | 11/2018 | Nguyen |
| 2001/0004607 A1 | 6/2001 | Olsen |
| 2001/0016516 A1 | 8/2001 | Takatsuka |
| 2001/0024971 A1 | 9/2001 | Brossard |
| 2001/0047291 A1 | 11/2001 | Garahi |
| 2002/0006822 A1 | 1/2002 | Krintzman |
| 2002/0042295 A1 | 4/2002 | Walker et al. |
| 2002/0043759 A1 | 4/2002 | Vancura |
| 2002/0045474 A1 | 4/2002 | Singer |
| 2002/0111210 A1 | 8/2002 | Luciano, Jr. et al. |
| 2002/0111213 A1 | 8/2002 | McEntee et al. |
| 2002/0113369 A1 | 8/2002 | Weingardt |
| 2002/0116615 A1 | 8/2002 | Nguyen et al. |
| 2002/0133418 A1 | 9/2002 | Hammond et al. |
| 2002/0137217 A1 | 9/2002 | Rowe et al. |
| 2002/0142825 A1 | 10/2002 | Lark et al. |
| 2002/0147047 A1 | 10/2002 | Letovsky et al. |
| 2002/0147049 A1 | 10/2002 | Carter, Sr. |
| 2002/0151366 A1 | 10/2002 | Walker et al. |
| 2002/0152120 A1 | 10/2002 | Howington |
| 2002/0167536 A1 | 11/2002 | Valdes et al. |
| 2002/0177483 A1 | 11/2002 | Cannon |
| 2002/0183105 A1 | 12/2002 | Cannon et al. |
| 2003/0001338 A1 | 1/2003 | Bennett et al. |
| 2003/0003996 A1 | 1/2003 | Nguyen |
| 2003/0008696 A1 | 1/2003 | Abecassis et al. |
| 2003/0027635 A1 | 2/2003 | Walker et al. |
| 2003/0064805 A1 | 4/2003 | Wells |
| 2003/0064807 A1 | 4/2003 | Walker et al. |
| 2003/0092480 A1 | 5/2003 | White et al. |
| 2003/0100361 A1 | 5/2003 | Sharpless et al. |
| 2003/0104860 A1 | 6/2003 | Cannon et al. |
| 2003/0104865 A1 | 6/2003 | Itkis et al. |
| 2003/0148809 A1 | 8/2003 | Nelson |
| 2003/0162588 A1 | 8/2003 | Brosnan et al. |
| 2003/0195024 A1 | 10/2003 | Slattery |
| 2003/0199295 A1 | 10/2003 | Vancura |
| 2003/0224852 A1 | 12/2003 | Walker et al. |
| 2003/0224854 A1 | 12/2003 | Joao |
| 2004/0002386 A1 | 1/2004 | Wolfe et al. |
| 2004/0005919 A1 | 1/2004 | Walker et al. |
| 2004/0023709 A1 | 2/2004 | Beaulieu et al. |
| 2004/0023716 A1 | 2/2004 | Gauselmann |
| 2004/0038736 A1 | 2/2004 | Bryant |
| 2004/0048650 A1 | 3/2004 | Mierau et al. |
| 2004/0068460 A1 | 4/2004 | Feeley |
| 2004/0082385 A1 | 4/2004 | Silva et al. |
| 2004/0106449 A1 | 6/2004 | Walker et al. |
| 2004/0127277 A1 | 7/2004 | Walker |
| 2004/0127290 A1 | 7/2004 | Walker et al. |
| 2004/0137987 A1 | 7/2004 | Nguyen et al. |
| 2004/0147308 A1 | 7/2004 | Walker et al. |
| 2004/0152508 A1 | 8/2004 | Lind |
| 2004/0199631 A1 | 10/2004 | Natsume |
| 2004/0214622 A1 | 10/2004 | Atkinson |
| 2004/0224753 A1 | 11/2004 | Odonovan et al. |
| 2004/0256803 A1 | 12/2004 | Ko |
| 2004/0259633 A1 | 12/2004 | Gentles et al. |
| 2005/0003890 A1 | 1/2005 | Hedrick et al. |
| 2005/0004980 A1 | 1/2005 | Vadjinia |
| 2005/0026696 A1 | 2/2005 | Hashimoto et al. |
| 2005/0054446 A1 | 3/2005 | Kammler |
| 2005/0101376 A1 | 5/2005 | Walker et al. |
| 2005/0101383 A1 | 5/2005 | Wells |
| 2005/0130728 A1 | 6/2005 | Nguyen et al. |
| 2005/0130731 A1 | 6/2005 | Englman |
| 2005/0137014 A1 | 6/2005 | Vetelaninen |
| 2005/0170883 A1 | 8/2005 | Muskin et al. |
| 2005/0181865 A1 | 8/2005 | Luciano |
| 2005/0181870 A1 | 8/2005 | Nguyen et al. |
| 2005/0181875 A1 | 8/2005 | Hoehne |
| 2005/0187020 A1 | 8/2005 | Amaitis et al. |
| 2005/0202875 A1 | 9/2005 | Murphy et al. |
| 2005/0209002 A1 | 9/2005 | Blythe et al. |
| 2005/0221881 A1 | 10/2005 | Lannert |

(56) References Cited

U.S. PATENT DOCUMENTS

| | | |
|---|---|---|
| 2005/0223219 A1 | 10/2005 | Gatto et al. |
| 2005/0239546 A1 | 10/2005 | Hedrick |
| 2005/0255919 A1 | 11/2005 | Nelson |
| 2005/0273635 A1 | 12/2005 | Wilcox et al. |
| 2005/0277471 A1 | 12/2005 | Russell et al. |
| 2005/0282637 A1 | 12/2005 | Gatto et al. |
| 2006/0009283 A1 | 1/2006 | Englman et al. |
| 2006/0036874 A1 | 2/2006 | Cockerille |
| 2006/0046822 A1 | 3/2006 | Kaminkow et al. |
| 2006/0046830 A1 | 3/2006 | Webb |
| 2006/0046849 A1 | 3/2006 | Kovacs |
| 2006/0068893 A1 | 3/2006 | Jaffe et al. |
| 2006/0073869 A1 | 4/2006 | LeMay et al. |
| 2006/0073897 A1 | 4/2006 | Englman et al. |
| 2006/0079317 A1 | 4/2006 | Flemming et al. |
| 2006/0148551 A1 | 7/2006 | Walker et al. |
| 2006/0189382 A1 | 8/2006 | Muir et al. |
| 2006/0217170 A1 | 9/2006 | Roireau |
| 2006/0217193 A1 | 9/2006 | Walker et al. |
| 2006/0247028 A1 | 11/2006 | Brosnan et al. |
| 2006/0247035 A1 | 11/2006 | Rowe et al. |
| 2006/0252530 A1 | 11/2006 | Oberberger et al. |
| 2006/0253481 A1 | 11/2006 | Guido et al. |
| 2006/0281525 A1 | 12/2006 | Borissov |
| 2006/0281541 A1 | 12/2006 | Nguyen et al. |
| 2006/0287106 A1 | 12/2006 | Jensen |
| 2007/0004510 A1 | 1/2007 | Underdahl et al. |
| 2007/0026935 A1 | 2/2007 | Wolf et al. |
| 2007/0026942 A1 | 2/2007 | Kinsley |
| 2007/0054739 A1 | 3/2007 | Amaitis et al. |
| 2007/0060254 A1 | 3/2007 | Muir |
| 2007/0060306 A1 | 3/2007 | Amaitis et al. |
| 2007/0060319 A1 | 3/2007 | Block et al. |
| 2007/0060358 A1 | 3/2007 | Amaitas et al. |
| 2007/0077981 A1 | 4/2007 | Hungate et al. |
| 2007/0087833 A1 | 4/2007 | Feeney et al. |
| 2007/0087834 A1 | 4/2007 | Moser et al. |
| 2007/0093299 A1 | 4/2007 | Bergeron |
| 2007/0129123 A1 | 6/2007 | Eryou et al. |
| 2007/0149279 A1 | 6/2007 | Norden et al. |
| 2007/0149286 A1 | 6/2007 | Bemmel |
| 2007/0159301 A1 | 7/2007 | Hirt et al. |
| 2007/0161402 A1 | 7/2007 | Ng. et al. |
| 2007/0184896 A1 | 8/2007 | Dickerson |
| 2007/0184904 A1 | 8/2007 | Lee |
| 2007/0191109 A1 | 8/2007 | Crowder et al. |
| 2007/0207852 A1 | 9/2007 | Nelson et al. |
| 2007/0207854 A1 | 9/2007 | Wolf et al. |
| 2007/0238505 A1 | 10/2007 | Okada |
| 2007/0241187 A1 | 10/2007 | Alderucci et al. |
| 2007/0248036 A1 | 10/2007 | Nevalainen |
| 2007/0257430 A1 | 11/2007 | Hardy et al. |
| 2007/0259713 A1 | 11/2007 | Fiden et al. |
| 2007/0259717 A1 | 11/2007 | Mattice et al. |
| 2007/0270213 A1 | 11/2007 | Nguyen et al. |
| 2007/0275777 A1 | 11/2007 | Walker et al. |
| 2007/0275779 A1 | 11/2007 | Amaitis et al. |
| 2007/0281782 A1 | 12/2007 | Amaitis et al. |
| 2007/0281785 A1 | 12/2007 | Amaitas et al. |
| 2007/0298873 A1 | 12/2007 | Nguyen et al. |
| 2008/0015032 A1 | 1/2008 | Bradford et al. |
| 2008/0020824 A1 | 1/2008 | Cuddy et al. |
| 2008/0032787 A1 | 2/2008 | Low et al. |
| 2008/0070652 A1 | 3/2008 | Nguyen et al. |
| 2008/0070681 A1 | 3/2008 | Marks et al. |
| 2008/0076505 A1 | 3/2008 | Nguyen |
| 2008/0076506 A1 | 3/2008 | Nguyen et al. |
| 2008/0076548 A1 | 3/2008 | Paulsen |
| 2008/0076572 A1 | 3/2008 | Nguyen et al. |
| 2008/0096650 A1 | 4/2008 | Baerlocher |
| 2008/0102916 A1 | 5/2008 | Kovacs |
| 2008/0102956 A1 | 5/2008 | Burman et al. |
| 2008/0102957 A1 | 5/2008 | Burnman et al. |
| 2008/0113772 A1 | 5/2008 | Burrill et al. |
| 2008/0119267 A1 | 5/2008 | Denlay |
| 2008/0126529 A1* | 5/2008 | Kim .............. H04W 4/02 709/223 |
| 2008/0139306 A1 | 6/2008 | Lutnick |
| 2008/0146321 A1 | 6/2008 | Parente |
| 2008/0146344 A1 | 6/2008 | Rowe et al. |
| 2008/0150902 A1 | 6/2008 | Edpalm et al. |
| 2008/0153583 A1 | 6/2008 | Huntley et al. |
| 2008/0161110 A1 | 7/2008 | Campbell |
| 2008/0167106 A1 | 7/2008 | Lutnick et al. |
| 2008/0182667 A1 | 7/2008 | Davis et al. |
| 2008/0200251 A1 | 8/2008 | Alderucci |
| 2008/0207307 A1 | 8/2008 | Cunningham, II et al. |
| 2008/0214258 A1 | 9/2008 | Brosnan et al. |
| 2008/0215319 A1 | 9/2008 | Lu |
| 2008/0234047 A1 | 9/2008 | Nguyen |
| 2008/0238610 A1 | 10/2008 | Rosenbereg |
| 2008/0248849 A1 | 10/2008 | Lutnick |
| 2008/0248865 A1 | 10/2008 | Cole |
| 2008/0252419 A1 | 10/2008 | Batchelor |
| 2008/0254878 A1 | 10/2008 | Sauders et al. |
| 2008/0254881 A1 | 10/2008 | Lutnick et al. |
| 2008/0254883 A1 | 10/2008 | Patel et al. |
| 2008/0254891 A1 | 10/2008 | Sauders et al. |
| 2008/0254892 A1 | 10/2008 | Sauders et al. |
| 2008/0254897 A1 | 10/2008 | Sauders et al. |
| 2008/0263173 A1 | 10/2008 | Weber et al. |
| 2008/0300058 A1 | 12/2008 | Sum et al. |
| 2008/0305864 A1 | 12/2008 | Kelly et al. |
| 2008/0305865 A1 | 12/2008 | Kelly et al. |
| 2008/0305866 A1 | 12/2008 | Kelly et al. |
| 2008/0311994 A1 | 12/2008 | Amaitas et al. |
| 2008/0318669 A1 | 12/2008 | Buchholz |
| 2008/0318686 A1 | 12/2008 | Crowder et al. |
| 2009/0005165 A1 | 1/2009 | Arezina et al. |
| 2009/0011822 A1 | 1/2009 | Englman |
| 2009/0017906 A1 | 1/2009 | Jackson |
| 2009/0029766 A1 | 1/2009 | Lutnick et al. |
| 2009/0054149 A1 | 2/2009 | Brosnan et al. |
| 2009/0077396 A1 | 3/2009 | Tsai et al. |
| 2009/0088258 A1 | 4/2009 | Saunders |
| 2009/0098925 A1 | 4/2009 | Gagner et al. |
| 2009/0104977 A1 | 4/2009 | Zielinski |
| 2009/0104983 A1 | 4/2009 | Okada |
| 2009/0118002 A1 | 5/2009 | Lyons |
| 2009/0118013 A1 | 5/2009 | Finnimore et al. |
| 2009/0118022 A1 | 5/2009 | Lyons et al. |
| 2009/0124366 A1 | 5/2009 | Aoki et al. |
| 2009/0124390 A1 | 5/2009 | Seelig et al. |
| 2009/0131151 A1 | 5/2009 | Harris et al. |
| 2009/0132163 A1 | 5/2009 | Ashley et al. |
| 2009/0137255 A1 | 5/2009 | Ashley et al. |
| 2009/0138133 A1 | 5/2009 | Buchholz et al. |
| 2009/0149245 A1 | 6/2009 | Fabbri |
| 2009/0149261 A1 | 6/2009 | Chen et al. |
| 2009/0153342 A1 | 6/2009 | Thorn |
| 2009/0156303 A1 | 6/2009 | Kiely et al. |
| 2009/0163272 A1 | 6/2009 | Baker |
| 2009/0176578 A1 | 7/2009 | Herrmann et al. |
| 2009/0191962 A1 | 7/2009 | Hardy et al. |
| 2009/0197684 A1 | 8/2009 | Arezina et al. |
| 2009/0216547 A1 | 8/2009 | Canora et al. |
| 2009/0219901 A1 | 9/2009 | Bull et al. |
| 2009/0221342 A1 | 9/2009 | Katz et al. |
| 2009/0227302 A1 | 9/2009 | Abe |
| 2009/0239666 A1 | 9/2009 | Hall et al. |
| 2009/0264190 A1 | 10/2009 | Davis et al. |
| 2009/0271287 A1 | 10/2009 | Halpern |
| 2009/0275410 A1 | 11/2009 | Kisenwether et al. |
| 2009/0275411 A1 | 11/2009 | Kisenwether et al. |
| 2009/0280910 A1 | 11/2009 | Gagner et al. |
| 2009/0282469 A1 | 11/2009 | Lynch |
| 2009/0298468 A1 | 12/2009 | Hsu |
| 2010/0002897 A1 | 1/2010 | Keady |
| 2010/0004058 A1 | 1/2010 | Acres |
| 2010/0016069 A1 | 1/2010 | Herrmann |
| 2010/0049738 A1 | 2/2010 | Mathur et al. |
| 2010/0056248 A1 | 3/2010 | Acres |
| 2010/0062833 A1 | 3/2010 | Mattice et al. |
| 2010/0062840 A1 | 3/2010 | Herrmann et al. |

(56) References Cited

U.S. PATENT DOCUMENTS

| | | |
|---|---|---|
| 2010/0079237 A1 | 4/2010 | Falk |
| 2010/0081501 A1 | 4/2010 | Carpenter et al. |
| 2010/0081509 A1 | 4/2010 | Burke |
| 2010/0099499 A1 | 4/2010 | Amaitis et al. |
| 2010/0106612 A1 | 4/2010 | Gupta |
| 2010/0120486 A1 | 5/2010 | DeWaal |
| 2010/0124967 A1 | 5/2010 | Lutnick et al. |
| 2010/0130276 A1 | 5/2010 | Fiden |
| 2010/0160035 A1 | 6/2010 | Herrmann |
| 2010/0160043 A1 | 6/2010 | Fujimoto et al. |
| 2010/0178977 A1 | 7/2010 | Kim et al. |
| 2010/0197383 A1 | 8/2010 | Rader et al. |
| 2010/0197385 A1 | 8/2010 | Aoki et al. |
| 2010/0203955 A1 | 8/2010 | Sylla |
| 2010/0203963 A1 | 8/2010 | Allen |
| 2010/0227662 A1 | 9/2010 | Speers et al. |
| 2010/0227670 A1 | 9/2010 | Arezine et al. |
| 2010/0227671 A1 | 9/2010 | Laaroussi |
| 2010/0227687 A1 | 9/2010 | Speers et al. |
| 2010/0234091 A1 | 9/2010 | Baerlocher et al. |
| 2010/0279764 A1 | 11/2010 | Allen et al. |
| 2010/0323780 A1 | 12/2010 | Acres |
| 2010/0325703 A1 | 12/2010 | Etchegoyen |
| 2011/0009181 A1 | 1/2011 | Speers et al. |
| 2011/0039615 A1 | 2/2011 | Acres |
| 2011/0065492 A1 | 3/2011 | Acres |
| 2011/0105216 A1 | 5/2011 | Cohen |
| 2011/0111827 A1 | 5/2011 | Nicely et al. |
| 2011/0111843 A1 | 5/2011 | Nicely et al. |
| 2011/0111860 A1 | 5/2011 | Nguyen |
| 2011/0118010 A1 | 5/2011 | Brune |
| 2011/0159966 A1 | 6/2011 | Gura et al. |
| 2011/0183732 A1 | 7/2011 | Block |
| 2011/0183749 A1 | 7/2011 | Allen |
| 2011/0207525 A1 | 8/2011 | Allen |
| 2011/0212711 A1 | 9/2011 | Scott |
| 2011/0212767 A1 | 9/2011 | Barclay et al. |
| 2011/0223993 A1 | 9/2011 | Allen et al. |
| 2011/0263318 A1 | 10/2011 | Agarwal et al. |
| 2011/0269548 A1 | 11/2011 | Barclay et al. |
| 2011/0306400 A1 | 12/2011 | Nguyen |
| 2011/0306426 A1 | 12/2011 | Novak et al. |
| 2012/0015709 A1 | 1/2012 | Bennett et al. |
| 2012/0028703 A1 | 2/2012 | Anderson et al. |
| 2012/0028718 A1 | 2/2012 | Barclay et al. |
| 2012/0034968 A1 | 2/2012 | Watkins et al. |
| 2012/0046110 A1 | 2/2012 | Amaitis |
| 2012/0094769 A1 | 4/2012 | Nguyen et al. |
| 2012/0100908 A1 | 4/2012 | Wells |
| 2012/0108319 A1 | 5/2012 | Caputo et al. |
| 2012/0122561 A1 | 5/2012 | Hedrick |
| 2012/0122567 A1 | 5/2012 | Gangadharan et al. |
| 2012/0122584 A1 | 5/2012 | Nguyen |
| 2012/0122590 A1 | 5/2012 | Nguyen |
| 2012/0172130 A1 | 7/2012 | Acres |
| 2012/0184362 A1 | 7/2012 | Barclay et al. |
| 2012/0184363 A1 | 7/2012 | Barclay et al. |
| 2012/0190426 A1 | 7/2012 | Acres |
| 2012/0194448 A1 | 8/2012 | Rothkopf |
| 2012/0208618 A1 | 8/2012 | Frerking |
| 2012/0231885 A1 | 9/2012 | Speer, II |
| 2012/0239566 A1 | 9/2012 | Everett |
| 2012/0322563 A1 | 12/2012 | Nguyen et al. |
| 2012/0330740 A1 | 12/2012 | Pennington et al. |
| 2013/0005433 A1 | 1/2013 | Holch |
| 2013/0005443 A1 | 1/2013 | Kosta |
| 2013/0005453 A1 | 1/2013 | Nguyen et al. |
| 2013/0059650 A1 | 3/2013 | Sylla et al. |
| 2013/0065668 A1 | 3/2013 | LeMay |
| 2013/0281188 A1 | 3/2013 | Guinn |
| 2013/0103965 A1 | 4/2013 | Golembeski |
| 2013/0104193 A1 | 4/2013 | Gatto et al. |
| 2013/0132745 A1 | 5/2013 | Schoening et al. |
| 2013/0165210 A1 | 6/2013 | Nelson |
| 2013/0185559 A1 | 7/2013 | Morel |
| 2013/0196756 A1 | 8/2013 | Nguyen |
| 2013/0196776 A1 | 8/2013 | Nguyen |
| 2013/0210513 A1 | 8/2013 | Nguyen |
| 2013/0210514 A1 | 8/2013 | Nguyen |
| 2013/0210530 A1 | 8/2013 | Nguyen |
| 2013/0225279 A1 | 8/2013 | Patceg |
| 2013/0225282 A1 | 8/2013 | Williams et al. |
| 2013/0252730 A1 | 9/2013 | Joshi |
| 2013/0316808 A1 | 11/2013 | Nelson |
| 2013/0337878 A1 | 12/2013 | Shepherd |
| 2014/0006129 A1 | 1/2014 | Heath |
| 2014/0057716 A1 | 2/2014 | Massing et al. |
| 2014/0087862 A1 | 3/2014 | Burke |
| 2014/0094295 A1 | 4/2014 | Nguyen |
| 2014/0094316 A1 | 4/2014 | Nguyen |
| 2014/0121005 A1 | 5/2014 | Nelson |
| 2014/0179431 A1 | 6/2014 | Nguyen |
| 2014/0274306 A1 | 9/2014 | Crawford |
| 2014/0274309 A1 | 9/2014 | Nguyen |
| 2014/0274319 A1 | 9/2014 | Nguyen |
| 2014/0274320 A1 | 9/2014 | Nguyen |
| 2014/0274342 A1 | 9/2014 | Nguyen |
| 2014/0274357 A1 | 9/2014 | Nguyen |
| 2014/0274360 A1 | 9/2014 | Nguyen |
| 2014/0274367 A1 | 9/2014 | Nguyen |
| 2014/0274388 A1 | 9/2014 | Nguyen |
| 2015/0089595 A1 | 3/2015 | Telles |
| 2015/0133223 A1 | 5/2015 | Carter |
| 2015/0143543 A1 | 8/2015 | Phegade |
| 2016/0125695 A1 | 5/2016 | Nguyen |
| 2017/0116819 A1 | 4/2017 | Nguyen |
| 2017/0116823 A1 | 4/2017 | Nguyen |
| 2017/0144071 A1 | 5/2017 | Nguyen |
| 2017/0148259 A1 | 5/2017 | Nguyen |
| 2017/0148261 A1 | 5/2017 | Nguyen |
| 2017/0148263 A1 | 5/2017 | Nguyen |
| 2017/0206734 A1 | 7/2017 | Nguyen |
| 2017/0228979 A1 | 8/2017 | Nguyen |
| 2017/0243440 A1 | 8/2017 | Nguyen |
| 2017/0337770 A1 | 11/2017 | Nguyen |
| 2018/0144581 A1 | 5/2018 | Nguyen |
| 2019/0005773 A1 | 1/2019 | Nguyen |

FOREIGN PATENT DOCUMENTS

| | | |
|---|---|---|
| GB | 2096376 | 10/1982 |
| GB | 2097570 | 11/1982 |
| GB | 2335524 | 9/1999 |
| PH | 12005000454 | 5/2007 |
| WO | WO 05073933 | 8/2005 |
| WO | WO 2008/027621 | 3/2008 |
| WO | WO 2009/026309 | 2/2009 |
| WO | WO 2009/062148 | 5/2009 |
| WO | WO 2010/017252 A1 | 2/2010 |

OTHER PUBLICATIONS

Finnegan, Amanda, "Casinos Connecting with Customers via Iphone Apps", May 27, 2010, Las Vegas Sun, Las Vegas, NV.
Gaming Today Staff, "Slots showcased at 2009 National Indian Gaming Assoc.", GamingToday.com, Apr. 14, 2009.
Green, Marian, "Testing Texting Casino Journal", Mar. 2, 2009.
Hasan, Ragib, et al., "A Survey of Peer-to-Peer Storage Techniques for Distributed File Systems", National Center for Supercomputing Applications, Department of Computer Science, University of Ilinois at Urbana Champain, Jun. 27, 2005.
Jones, Trahern, "Telecon-equipped drones could revolutionize wireless market", azcentral.com, http://www.azcentral.com/business/news/articles/20130424telecom-equipped-drones-could-revolutionize-wireless-market.html, downloaded Jul. 2, 2013, 2 pages.
Yancey, Kitty Bean, "Navigate Around Vegas with New iPhone Apps", USA Today, Jun. 3, 2010.
iAPS, Daily Systems LLC, 2010.
U.S. Appl. No. 12/945,888, filed Nov. 14, 2010.
U.S. Appl. No. 12/945,889, filed Nov. 14, 2010.
U.S. Appl. No. 13/622,702, filed Sep. 19, 2012.

(56) References Cited

OTHER PUBLICATIONS

U.S. Appl. No. 13/800,917, filed Mar. 13, 2013.
U.S. Appl. No. 13/296,182, filed Nov. 15, 2011.
U.S. Appl. No. 13/801,234, filed Mar. 13, 2013.
U.S. Appl. No. 13/801,171, filed Mar. 13, 2013.
U.S. Appl. No. 13/843,192, filed Mar. 15, 2013.
U.S. Appl. No. 13/843,087, filed Mar. 15, 2013.
U.S. Appl. No. 13/632,743, filed Oct. 1, 2012.
U.S. Appl. No. 13/632,828, filed Oct. 1, 2012.
U.S. Appl. No. 13/833,953, filed Mar. 15, 2013.
U.S. Appl. No. 12/619,672, filed Nov. 16, 2009.
U.S. Appl. No. 13/801,121, filed Mar. 13, 2013.
U.S. Appl. No. 12/581,115, filed Oct. 17, 2009.
U.S. Appl. No. 13/801,076, filed Mar. 13, 2013.
U.S. Appl. No. 13/617,717, filed Nov. 12, 2009.
U.S. Appl. No. 13/633,118, filed Oct. 1, 2012.
U.S. Appl. No. 12/797,610, filed Jun. 10, 2010.
U.S. Appl. No. 13/801,256, filed Mar. 13, 2013.
U.S. Appl. No. 12/757,968, filed Apr. 9, 2010.
U.S. Appl. No. 12/797,616, filed Jun. 10, 2010.
U.S. Appl. No. 13/557,063, filed Jul. 24, 2012.
U.S. Appl. No. 13/833,116, filed Mar. 15, 2013.
U.S. Appl. No. 13/801,271, filed Mar. 13, 2011.
Office Action for U.S. Appl. No. 12/945,888 dated Apr. 10, 2012.
Final Office Action for U.S. Appl. No. 12/945,888 dated Sep. 21, 2012.
Advisory Action for U.S. Appl. No. 12/945,888 dated Jan. 30, 2013.
Office Action for U.S. Appl. No. 12/581,115 dated Dec. 20, 2011.
Final Office Action for U.S. Appl. No. 12/581,115 dated Sep. 13, 2012.
Notice of Allowance for U.S. Appl. No. 12/581,115 dated May 24, 2013.
Office Action for U.S. Appl. No. 12/619,672 dated Dec. 20, 2011.
Final Office Action for U.S. Appl. No. 12/619,672 dated Nov. 6, 2012.
Office Action for U.S. Appl. No. 12/619,672 dated Mar. 7, 2013.
Office Action for U.S. Appl. No. 12/617,717 dated Oct. 4, 2011.
Office Action for U.S. Appl. No. 12/617,717 dated Apr. 4, 2012.
Advisory Action for U.S. Appl. No. 12/617,717 dated Jun. 12, 2011.
Office Action for U.S. Appl. No. 12/617,717 dated Jun. 17, 2013.
Office Action for U.S. Appl. No. 12/797,610 dated Dec. 8, 2011.
Final Office Action for U.S. Appl. No. 12/797,610 dated Jun. 6, 2012.
Office Action for U.S. Appl. No. 12/797,610 dated Feb. 26, 2013.
Office Action for U.S. Appl. No. 12/757,968, dated May 9, 2012.
Final Office Action for U.S. Appl. No. 12/757,968, dated Nov. 29, 2012.
Office Action for U.S. Appl. No. 12/757,968, dated Apr. 25, 2013.
Office Action for U.S. Appl. No. 12/797,616 dated Mar. 15, 2012.
Final Office Action for U.S. Appl. No. 12/797,616 dated Oct. 13, 2012.
Office Action for U.S. Appl. No. 12/797,616 dated Feb. 13, 2013.
Final Office Action for U.S. Appl. No. 12/797,616 dated May 8, 2013.
Office Action for U.S. Appl. No. 13/296,182 dated Dec. 5, 2012.
Brochure, 5000 Ft. Inc., 1 page, Nov. 2010.
Frontier Fortune game, email notification, MGM Resorts Intl., Aug. 9, 2013.
"Getting Back in the Game: Geolocation Can Ensure Compliance with New iGaming Regulations", White Paper, Quova, Inc., 2010.
Notice of Allowance of U.S. Appl. No. 12/619,672, dated Aug. 23, 2013.
Office Action for U.S. Appl. No. 13/633,118, dated Sep. 20, 2013.
Office Action for U.S. Appl. No. 13/801,256, dated Jul. 2, 2013.
Notice of Allowance for U.S. Appl. No. 12/619,672, dated Oct. 3, 2013.
Notice of Allowance for U.S. Appl. No. 12/757,968, dated Oct. 11, 2013.
Final Office Action for U.S. Appl. No. 12/797,610, dated Jul. 10, 2013.
Notice of Allowance for U.S. Appl. No. 12/757,968, dated Dec. 18, 2013.
Office Action for U.S. Appl. No. 12/945,889, dated Dec. 18, 2013.
Office Action for U.S. Appl. No. 13/632,828, dated Jul. 30, 2013.
Restriction Requirement for U.S. Appl. No. 13/801,256, dated Dec. 30, 2013.
Office Action for U.S. Appl. No. 13/801,171, dated Dec. 26, 2013.
Office Action for U.S. Appl. No. 13/801,234, dated Jan. 10, 2014.
Final Office Action for U.S. Appl. No. 13/296,182, dated Feb. 12, 2014.
Office Action for U.S. Appl. No. 12/617,717, dated Feb. 25, 2014.
Office Action for U.S. Appl. No. 13/801,076, dated Mar. 28, 2014.
Final Office Action for U.S. Appl. No. 13/633,118, dated Apr. 3, 2014.
Office Action for U.S. Appl. No. 13/843,192, dated Apr. 3, 2014.
Office Action for U.S. Appl. No. 13/632,743, dated Apr. 10, 2014.
Office Action for U.S. Appl. No. 13/801,121, dated Apr. 11, 2014.
Final Office Action for U.S. Appl. No. 12/945,889, dated Jun. 30, 2014.
Notice of Allowance for U.S. Appl. No. 12/617,717, dated Jul. 14, 2014.
Office Action for U.S. Appl. No. 13/801,121, dated Sep. 24, 2014.
Office Action for U.S. Appl. No. 13/801,171, dated Sep. 22, 2014.
Office Action for U.S. Appl. No. 13/801,234, dated Oct. 1, 2014.
Office Action for U.S. Appl. No. 13/801,271, dated Oct. 31, 2014.
Final Office Action for U.S. Appl. No. 13/843,192, dated Oct. 21, 2014.
Office Action for U.S. Appl. No. 13/632,743, dated Oct. 23, 2014.
Office Action for U.S. Appl. No. 12/945,889, dated Oct. 23, 2014.
Office Action for U.S. Appl. No. 13/632,828, dated Nov. 7, 2014.
Office Action fpr U.S. Appl. No. 12/797,610, dated Dec. 15, 2014.
Final Office Action for U.S. Appl. No. 12/945,889, dated Feb. 12, 2015.
Final Office Action for U.S. Appl. No. 13/801,171, dated Mar. 16, 2015.
Office Action for U.S. Appl. No. 13/833,116, dated Mar. 27, 2015.
Office Action for U.S. Appl. No. 13/632,828, dated Apr. 10, 2015.
Final Office Action for U.S. Appl. No. 13/801,121, dated Apr. 21, 2015.
Final Office Action for U.S. Appl. No. 13/557,063, dated Apr. 28, 2015.
Office Action for U.S. Appl. No. 13/296,182, dated Jun. 5, 2015.
Office Action for U.S. Appl. No. 13/843,192, dated Jun. 19, 2015.
Office Action for U.S. Appl. No. 12/797,610, dated Jul. 14, 2015.
Final Office Action for U.S. Appl. No. 13/833,953, dated Jul. 17, 2015.
Notice of Allowance for U.S. Appl. No. 12/945,889, dated Jul. 22, 2015.
Office Action for U.S. Appl. No. 12/797,616, dated Aug. 10, 2015.
Final Office Action for U.S. Appl. No. 13/801,234, dated Aug. 14, 2015.
Final Office Action for U.S. Appl. No. 13/833,116, dated Sep. 24, 2015.
Office Action for U.S. Appl. No. 13/801,121, dated Oct. 2, 2015.
Office Action for U.S. Appl. No. 14/017,150, dated Oct. 7, 2015.
Office Action for U.S. Appl. No. 14/017,159, dated Oct. 7, 2015.
Office Action for U.S. Appl. No. 13/801,271 dated Oct. 19, 2015.
Office Action for U.S. Appl. No. 14/211,536 dated Oct. 19, 2015.
Final Office Action for U.S. Appl. No. 13/632,828, dated Oct. 22, 2015.
Office Action for U.S. Appl. No. 14/217,066, dated Dec. 17, 2015.
Notice of Allowance for U.S. Appl. No. 13/557,063, dated Dec. 23, 2015.
Office Action for U.S. Appl. No. 13/296,182, dated Dec. 23, 2015.
Final Office Action for U.S. Appl. No. 13/843,192, dated Dec. 30, 2015.
Office Action for U.S. Appl. No. 13/801,076, dated Jan. 11, 2016.
Office Action for U.S. Appl. No. 12/945,888, dated Jan. 22, 2016.
Final Office Action for U.S. Appl. No. 12/797,616, dated Jun. 12, 2016.
Office Action for U.S. Appl. No. 13/843,087, dated Feb. 25, 2016.
Office Action for U.S. Appl. No. 13/800,917, dated Feb. 25, 2016.

(56) References Cited

OTHER PUBLICATIONS

Advisory Action for U.S. Appl. No. 13/632,828, dated Feb. 25, 2016.
Office Action for U.S. Appl. No. 13/801,234, dated Mar. 8, 2016.
Office Action for U.S. Appl. No. 14/216,986, dated Mar. 9, 2016.
Final Office Action for U.S. Appl. No. 13/801,271, dated Mar. 11, 2016.
Office Action for U.S. Appl. No. 13/622,702, dated Mar. 22, 2016.
Final Office Action for U.S. Appl. No. 13/633,118, dated Mar. 24, 2016.
Final Office Action for U.S. Appl. No. 14/189,948, dated Apr. 6, 2016.
Final Office Action for U.S. Appl. No. 12/797,610, dated Apr. 21, 2016.
Final Office Action for U.S. Appl. No. 14/017,150, dated Apr. 26, 2016.
Final Office Action for U.S. Appl. No. 13/801,121, dated May 11, 2016.
Final Office Action for U.S. Appl. No. 14/017,159, dated Jun. 6, 2016.
Office Action for U.S. Appl. No. 13/801,171, dated Jun. 6, 2016.
Office Action for U.S. Appl. No. 13/843,192, dated Jun. 9, 2016.
Final OA for U.S. Appl. No. 12/945,888, dated Jun. 28, 2016.
Notice of Allowance for U.S. Appl. No. 13/833,953, dated Jul. 6, 2016.
Final Office Action for U.S. Appl. No. 13/801,171, dated May 21, 2014.
Final Office Action for U.S. Appl. No. 13/801,234, dated May 22, 2014.
Office Action for U.S. Appl. No. 14/211,536, dated Jul. 13, 2016.
Notice of Allowance for U.S. Appl. No. 13/801,076, dated Jul. 11, 2016.
Office Action for U.S. Appl. No. 13/296,182, dated Jul. 20, 2016.
Restriction Requirement for U.S. Appl. No. 13/296,182, dated Oct. 12, 2012.
Advisory Action for U.S. Appl. No. 13/296,182, dated May 8, 2014.
Advisory Action for U.S. Appl. No. 13/843,192, dated May 8, 2014.
Notice of Allowance for U.S. Appl. No. 13/843,192, dated Aug. 10, 2016.
Office Action for U.S. Appl. No. 14/217,066, dated Dec. 22, 2016.
Final Office Action for U.S. Appl. No. 14/216,986, dated Sep. 23, 2016.
Office Action for U.S. Appl. No. 14/017,159, dated Sep. 23, 2016.
Office Action for U.S. Appl. No. 13/632,743, dated Sep. 23, 2016.
Final Office Action for U.S. Appl. No. 13/801,234, dated Oct. 14, 2016.
Final Office Action for U.S. Appl. No. 13/843,087, dated Oct. 13, 2016.
Final Office Action for U.S. Appl. No. 13/622,702, dated Oct. 13, 2016.
Office Action for U.S. Appl. No. 14/189,948, dated Nov. 7, 2016.
Final Office Action for U.S. Appl. No. 14/211,536, dated Mar. 14, 2014.
Notice of Allowance for U.S. Appl. No. 13/833,116, dated Oct. 11, 2016.
Notice of Allowance for U.S. Appl. No. 13/801,271, dated Dec. 2, 2016.
Notice of Allowance for U.S. Appl. No. 12/797,610, dated Dec. 7, 2016.
Notice of Allowance for U.S. Appl. No. 13/632,828, dated Dec. 16, 2016.
Final Office Action for U.S. Appl. No. 13/801,171, dated Dec. 19, 2016.
Notice of Allowance for U.S. Appl. No. 14/211,536, dated Dec. 28, 2016.
Notice of Allowance for U.S. Appl. No. 13/801,256, dated Jan. 20, 2017.
Office Action for U.S. Appl. No. 13/800,917, dated Feb. 3, 2017.
Final Office Action for U.S. Appl. No. 12/797,616, dated Feb. 10, 2017.
Office Action for U.S. Appl. No. 12/945,888, dated Feb. 28, 2017.
Final Office Action for U.S. Appl. No. 14/189,948, dated Mar. 17, 2017.
Office Action for U.S. Appl. No. 15/400,840, dated Mar. 10, 2017.
Notice of Allowance for U.S. Appl. No. 13/801,121, dated Mar. 29, 2017.
Office Action for U.S. Appl. No. 15/270,333, dated Mar. 30, 2017.
Office Action for U.S. Appl. No. 15/402,945, dated Apr. 5, 2017.
Office Action for U.S. Appl. No. 15/271,488, dated Apr. 19, 2017.
Final Office Action for U.S. Appl. No. 14/217,066, dated Apr. 21, 2017.
Office Action for U.S. Appl. No. 14/216,986 dated Apr. 26, 2017.
Office Action for U.S. Appl. No. 13/801,171, dated Jun. 14, 2017.
Office Action for U.S. Appl. No. 14/017,159, dated Jun. 29, 2017.
Notice of Allowance for U.S. Appl. No. 15/270,333, dated Jul. 5, 2017.
Final Office Action for U.S. Appl. No. 13/800,917, dated Jul. 13, 2017.
Notice of Allowance for U.S. Appl. No. 13/801,234, dated Jul. 5, 2017.
Notice of Allowance for U.S. Appl. No. 14/217,066, dated Jul. 14, 2017.
Final Office Action for U.S. Appl. No. 14/518,909, dated Jul. 19, 2017.
Final Office Action for U.S. Appl. No. 13/801,121, dated Sep. 15, 2016.
Advisory Action for U.S. Appl. No. 13/801,121, dated Jul. 17, 2015.
Advisory Action for U.S. Appl. No. 13/801,121, dated Jul. 19, 2016.
Notice of Allowance for U.S. Appl. No. 15/293,751, dated Aug. 4, 2017.
Advisory Action for U.S. Appl. No. 14/189,948, dated Jul. 28, 2017.
Final OA for U.S. Appl. No. 13/801,256, dated Aug. 15, 2014.
Final OA for U.S. Appl. No. 13/801,256, dated Feb. 18, 2015.
Advisory Action for U.S. Appl. No. 13/801,256, dated Dec. 5, 2014.
Office Action for U.S. Appl. No. 13/801,256, dated Jan. 12, 2016.
Final Office Action for U.S. Appl. No. 13/801,256, dated Aug. 16, 2016.
Office Action for U.S. Appl. No. 13/801,256, dated Aug. 18, 2017.
Office Action for U.S. Appl. No. 13/622,702, dated Aug. 31, 2017.
Office Action for U.S. Appl. No. 12/945,888, dated Sep. 1, 2017.
Office Action for U.S. Appl. No. 14/017,150, dated Sep. 7, 2017.
Notice of Allowance for U.S. Appl. No. 14/189,948, dated Sep. 13, 2017.
Office Action for U.S. Appl. No. 15/138,086, dated Oct. 19, 2017.
Notice of Allowance for U.S. Appl. No. 15/402,945 dated Nov. 21, 2017.
Final Office Action for U.S. Appl. No. 13/801,171, dated Dec. 13, 2017.
Final Office Action for U.S. Appl. No. 15/271,488, dated Dec. 21, 2017.
Office Action for U.S. Appl. No. 15/671,133, dated Dec. 22, 2017.
Final Office Action for U.S. Appl. No. 14/216,986, dated Dec. 26, 2017.
Restriction Requirement for U.S. Appl. No. 15/427,307, dated Jan. 17, 2018.
Office Action for U.S. Appl. No. 15/798,363, dated Jan. 26, 2018.
Office Action for U.S. Appl. No. 15/427,291, dated Jan. 29, 2018.
Final Office Action for U.S. Appl. No. 14/017,159, dated Feb. 1, 2018.
Final Office Action for U.S. Appl. No. 13/622,702, dated Feb. 22, 2018.
Office Action for U.S. Appl. No. 15/811,654, dated Feb. 22, 2018.
Final Office Action for U.S. Appl. No. 13/622,702, dated Feb. 27, 2018.
Final Office Action for U.S. Appl. No. 15/427,308, dated Mar. 19, 2018.
Office Action for U.S. Appl. No. 15/876,095, dated Apr. 3, 2018.
Office Action for U.S. Appl. No. 15/835,448, dated Apr. 4, 2018.
Office Action for U.S. Appl. No. 15/427,307, dated Apr. 9, 2018.
Office Action for U.S. Appl. No. 14/216,986, dated Apr. 6, 2018.
Office Action for U.S. Appl. No. 15/426,898 dated Apr. 16, 2018.
Notice of Allowance for U.S. Appl. No. 15/402,945, dated May 25, 2018.

(56) References Cited

OTHER PUBLICATIONS

Office Action for U.S. Appl. No. 15/495,973, dated Jun. 4, 2018.
Notice of Allowance for U.S. Appl. No. 15/427,291 dated Jun. 18, 2018.
Notice of Allowance for U.S. Appl. No. 15/271,488, dated Jun. 19, 2018.
Notice of Allowance for U.S. Appl. No. 15/480,295, dated Jun. 20, 2018.
Office Action for U.S. Appl. No. 14/963,106, dated Jun. 22, 2018.
Office Action for U.S. Appl. No. 14/993,055, dated Jun. 22, 2018.
Final Office Action for U.S. Appl. No. 15/427,307, dated Jul. 9, 2018.
Notice of Allowance for U.S. Appl. No. 13/633,118, dated Aug. 3, 2018.
Office Action for U.S. Appl. No. 15/671,133, dated Aug. 9, 2018.
Office Action for U.S. Appl. No. 15/427,308, dated Aug. 15, 2018.
Office Action for U.S. Appl. No. 15/798,363, dated Aug. 29, 2018.
Office Action for U.S. Appl. No. 15/428,922 dated Sep. 17, 2018.
Office Action for U.S. Appl. No. 15/495,975, dated Sep. 21, 2018.
Notice of Allowance for U.S. Appl. No. 15/271,488, dated Sep. 24, 2018.
Notice of Allowance for U.S. Appl. No. 15/876,095, dated Sep. 24, 2018.
Office Action for U.S. Appl. No. 13/622,702, dated Oct. 3, 2018.
Office Action for U.S. Appl. No. 15/293,751, dated Apr. 6, 2017.
Notice of Allowance for U.S. Appl. No. 13/801,171, dated Oct. 31, 2018.
Final Office Action for U.S. Appl. No. 15/835,448, dated Nov. 2, 2018.
Final Office Action for U.S. Appl. No. 15/480,295, dated Nov. 7, 2018.
Final Office Action for U.S. Appl. No. 14/963,106, dated Dec. 14, 2018.
Final Office Action for U.S. Appl. No. 14/993,055, dated Dec. 14, 2018.
Office Action for U.S. Appl. No. 16/162,358, dated Dec. 31, 2018.
Office Action for U.S. Appl. No. 14/017,159, dated Jan. 11, 2019.
Office Action for U.S. Appl. No. 15/426,898, dated Jan. 11, 2019.
Final Office Action for U.S. Appl. No. 15/495,973, dated Jan. 11, 2019.
Office Action for U.S. Appl. No. 14/216,986, dated Jan. 14, 2019.
Office Action for U.S. Appl. No. 15/427,307, dated Jan. 18, 2019.
Final Office Action for U.S. Appl. No. 15/798,363, dated Feb. 4, 2019.
Office Action for U.S. Appl. No. 16/125,614, dated Feb. 25, 2019.

* cited by examiner

| Device ID | Device Position | Vessel Position | Time | Permit Play Of Game Of Chance? |
|---|---|---|---|---|
| 1 | Main Pool | International | 11 a.m. | Yes |
| 2 | Childcare Center | International | 3 p.m. | No |
| 3 | Night Club | International | 11 p.m. | Yes |
| 4 | Gift Store | National | 8 a.m. | Yes |

FIG. 2C

CONTROL OF MOBILE GAME PLAY ON A MOBILE VEHICLE

CROSS-REFERENCE TO RELATED APPLICATIONS

This application is a continuation of U.S. patent application Ser. No. 13/632,828, filed Oct. 1, 2012, and entitled "CONTROL OF MOBILE GAME PLAY ON A MOBILE VESSEL," which is hereby incorporated herein by reference, and which in turn claims priority benefit of U.S. Provisional Application No. 61/542,705, filed Oct. 3, 2011, and entitled "CONTROL OF MOBILE GAME PLAY ON A CRUISE SHIP," which is hereby incorporated herein by reference.

FIELD OF THE INVENTION

The present disclosure relates generally to cruise ships. More particularly, the present disclosure relates generally to control of mobile game play on a vessel.

BACKGROUND OF THE INVENTION

In a gaming environment, determining when to allow play of a game of chance is important to avoid breaking any gaming rules or laws. However, control of playing game of chance is difficult to monitor when game play is on a mobile device and in a movable environment, such as a cruise ship. There are national and international laws, as well as any other user desired criteria that need to be considered.

OVERVIEW

The invention provides for the control of mobile game play on a mobile vessel. In one embodiment, a determination of whether to permit or deny play of the on-board game of chance may be based upon at least a global and local device position of the mobile gaming device. In another embodiment, determination of whether to permit or deny play of the on-board game of chance may be based upon other predefined rules such as a time rule, captain's rule, user defined rules, and other criteria. For example, determination of whether to permit or deny play of the on-board game of chance may be based upon whether the vessel is in international or national waters. In another example, determination of whether to permit or deny play of the on-board game of chance may be based upon the current time.

In one embodiment, a system for controlling mobile gaming on a vessel may have a plurality of mobile gaming devices, each of the plurality of mobile gaming device associated with a player and a location server operable to: (a) track a device position of each of the plurality of mobile gaming devices, the device position being relative to the vessel; and (b) track a vessel position, the vessel position being a global location relative to earth. The system may also have a mobile gaming management server configured to communicate with the location server and a gaming server, the mobile gaming management server operable to individually control whether each of the plurality of mobile gaming devices is permitted to play a game of chance based on the device position and the vessel position.

In another embodiment, a method for controlling mobile gaming on a vessel may include tracking a vessel position of the vessel, tracking a device position for each of a plurality of mobile gaming devices, receiving a request to play a game of chance from at least one of the plurality of mobile gaming devices, determining whether the game of chance is permitted to be played on the mobile gaming device, the determining based on at least the vessel position of the vessel and the device position of the mobile gaming device, and enabling the game of chance on the mobile gaming device if the determining determines that the game of chance is permitted to be played on the mobile gaming device.

The present invention provides other hardware configured to perform the methods of the invention, as well as software stored in a machine-readable medium (e.g., a tangible storage medium) to control devices to perform these methods. These and other features will be presented in more detail in the following detailed description of the invention and the associated figures.

BRIEF DESCRIPTION OF THE DRAWINGS

The accompanying drawings, which are incorporated into and constitute a part of this specification, illustrate one or more example embodiments and, together with the description of example embodiments, serve to explain the principles and implementations.

In the drawings:

FIG. 2C illustrates an example gaming rules table.

DESCRIPTION OF EXAMPLE EMBODIMENTS

Embodiments are described herein in the context of control of mobile game play on a mobile vessel. The following detailed description is illustrative only and is not intended to be in any way limiting. Other embodiments will readily suggest themselves to such skilled persons having the benefit of this disclosure. Reference will now be made in detail to implementations as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

The invention provides for the control of on-board game of chance play on a mobile device while on a vessel. A vessel may be any movable transport device such as an airplane, car, bus, and any vehicle in the water, such as cruiseliners, riverboats, and the like. In one embodiment, a determination of whether to permit or deny play of the on-board game of chance may be based upon at least a global and local device position of the mobile gaming device. In another embodiment, determination of whether to permit or deny play of the on-board game of chance may be based upon other pre-defined rules such as a time rule, captain's rule (e.g. any user desired defined rules), and other criteria. For example, determination of whether to permit or deny play of the on-board game of chance may be based upon whether the vessel is in international or national waters. In another example, determination of whether to permit or deny play of the on-board game of chance may be based upon the current time.

Figure 1:
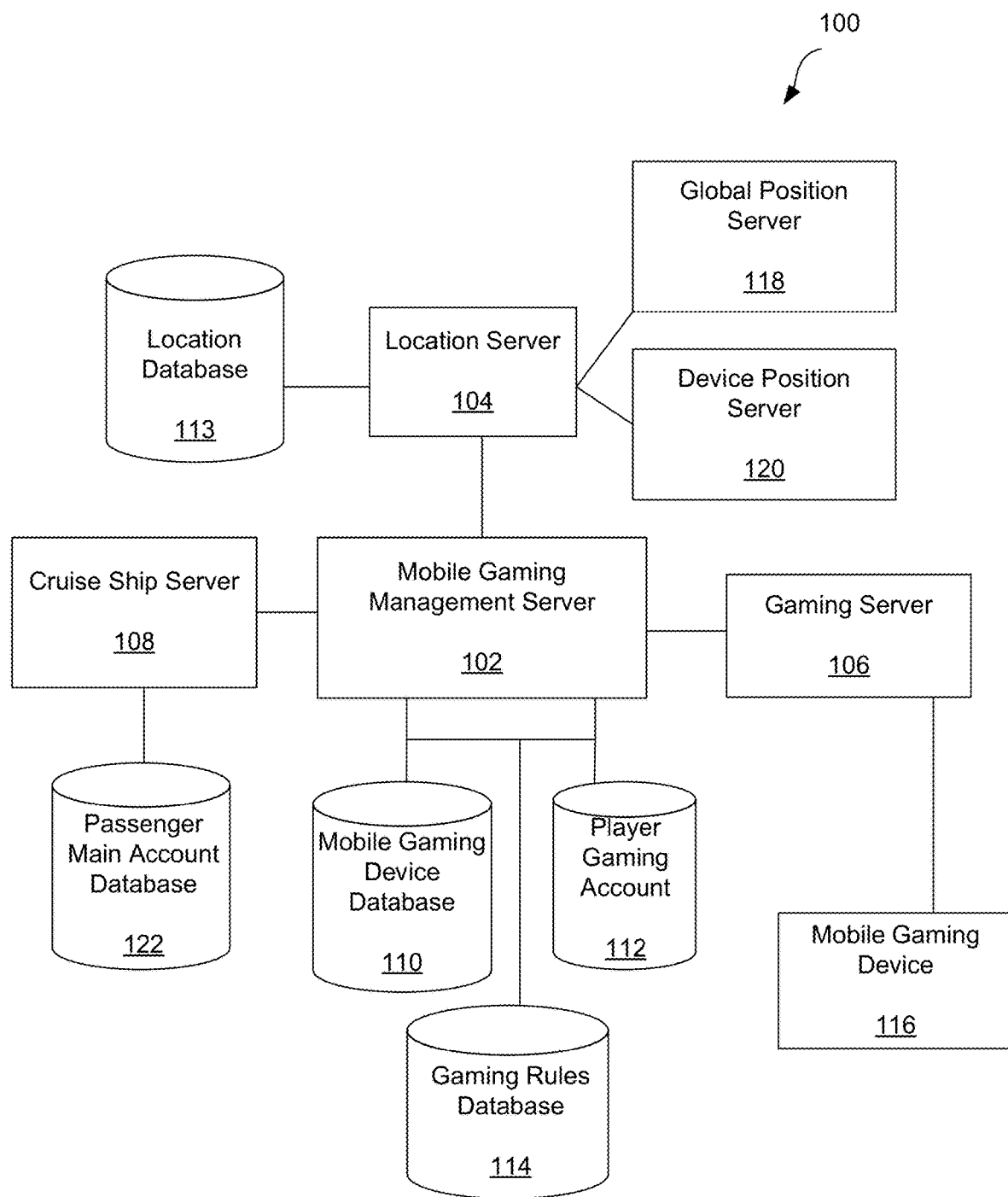
FIG. 1 is an example block diagram of a game control system.

FIG. 1 is an example block diagram of a game control system. The game control system 100 may have a mobile gaming management server 102 configured to communicate with a location server 104, a gaming server 106, and a vessel server 108. The mobile gaming management server 102 may be designed as an intermediary server to store data or information such as mobile gaming device information, gaming rules database, player gaming accounts, and any other desired data or information. The mobile gaming device information may be stored in the mobile gaming device database 110 and may include information such as the mobile gaming device identification, information of the user using the mobile gaming device 116, programs on the mobile gaming device 116, and other mobile gaming device data. The mobile gaming device 116 may be any type of portable mobile gaming device such as a mobile phone, a portable media player, a personal digital assistant, a portable gaming device, or any other similar device.

The user of the mobile gaming device 116 may also have a player gaming account 112. The player gaming account 112 may store any information such as user contact information, available funds in the player gaming account, and any other player information. In one embodiment, any wins from a game of chance played by the user of the mobile gaming device 116 may be stored in the player gaming account 112.

Gaming rules may be stored in the gaming rules database 114. The rules may be any criteria used to determine whether to permit or deny play of the game of chance on the mobile device. For example, the determination of whether to permit or deny play of the game of chance may be based on at least the device position of the mobile gaming device and the location of the vessel. If the device is, for example, located near the childcare center and the vessel is in international waters, play of the game of chance may be denied. However, if the user is sitting at a bar and the vessel is in international waters, play of the game of chance may be granted.

In another example, determination to permit or deny play of the game of chance may also be based upon a time rule that may be predetermined by the vessel. For example, the vessel may set games of chance to be played between 7 a.m. to 2 a.m. Thus, if the request to play a game of chance is made at 3 a.m., play of the game of chance may be denied. If the request to play a game of chance is made at 12 p.m., play of the game of chance may be permitted.

The mobile gaming management server 102 may be configured to communicate with a gaming server 106, which may be configured to communicate with the mobile gaming device 116. The mobile gaming device 116 may transmit a request to the gaming server 106 to play at least one game of chance on the mobile gaming device. The gaming server 106 may transmit the request to play the game of chance to the mobile gaming management server 102. The mobile gaming management server 102 may then obtain a device position and a vessel position from the location server 104.

The location server 104 may be configured to determine the location of the mobile gaming device 116 and the vessel. The location server 104 may have a global position server 118 to determine the location of the vessel relative to the globe, earth, or world. Global position server 118 may use any known position or location method to determine the location of the vessel such as cellular positioning, triangulation, global positioning systems, or any other location or positioning determining method.

The location server 104 may also have a device position server 120 designed or configured to determine the location of the mobile gaming device 116 relative to the vessel. The device position of the mobile gaming device 116 may be the position of the mobile gaming device 116 relative to the vessel. The device position server 120 may use any known position or location method to determine the location of the mobile gaming device 116 such as cellular positioning, triangulation, global positioning systems, or any other location or positioning determining method.

The location server 104 may have a location database 113 to store the global vessel position of the vessel and the device position of the mobile gaming device. The vessel position and device position may be associated with a mobile gaming device.

Mobile gaming management server 102 may also be configured to communicate with a vessel server 108. Vessel server 108 may be configured to store customer information in the passenger main account database 122. The vessel server 108 may store information such as customer credit card information, address, username and password, date of birth, and any other desired information.

In use, when boarding a vessel, the passenger's information may be stored in the passenger main account 122 in the vessel server 108. The passenger's information may include financial information such as credit card information, address, birth date, family members, room number, room key number, username and password, and any other desired or relevant passenger information.

The passenger may be associated with a mobile gaming device 116 used to play the game of chance. In one embodiment, the mobile gaming device 116 may be provided to the passenger. In another embodiment, the passenger may utilize his own mobile gaming device 116. The passenger may request to play a game of chance on the mobile gaming device 116. The passenger may also be authenticated and/or verified by including the passenger's username and password with the request. However, any other authentication and/or verification method may be used to authenticate and/or verify the user of the mobile gaming device such as biometric verification (i.e. voice recognition, retinal scan, fingerprint verification, and the like).

The request to play a game of chance may be transmitted from the mobile gaming device 116 to the gaming server 106. The gaming server 106 may transmit the request to the mobile gaming management server 102. The mobile gaming management server 102 may determine whether the passenger has a player gaming account 112. If the passenger does not have a player gaming account 112, a player gaming account 112 may be created for the passenger.

Figure 2A:
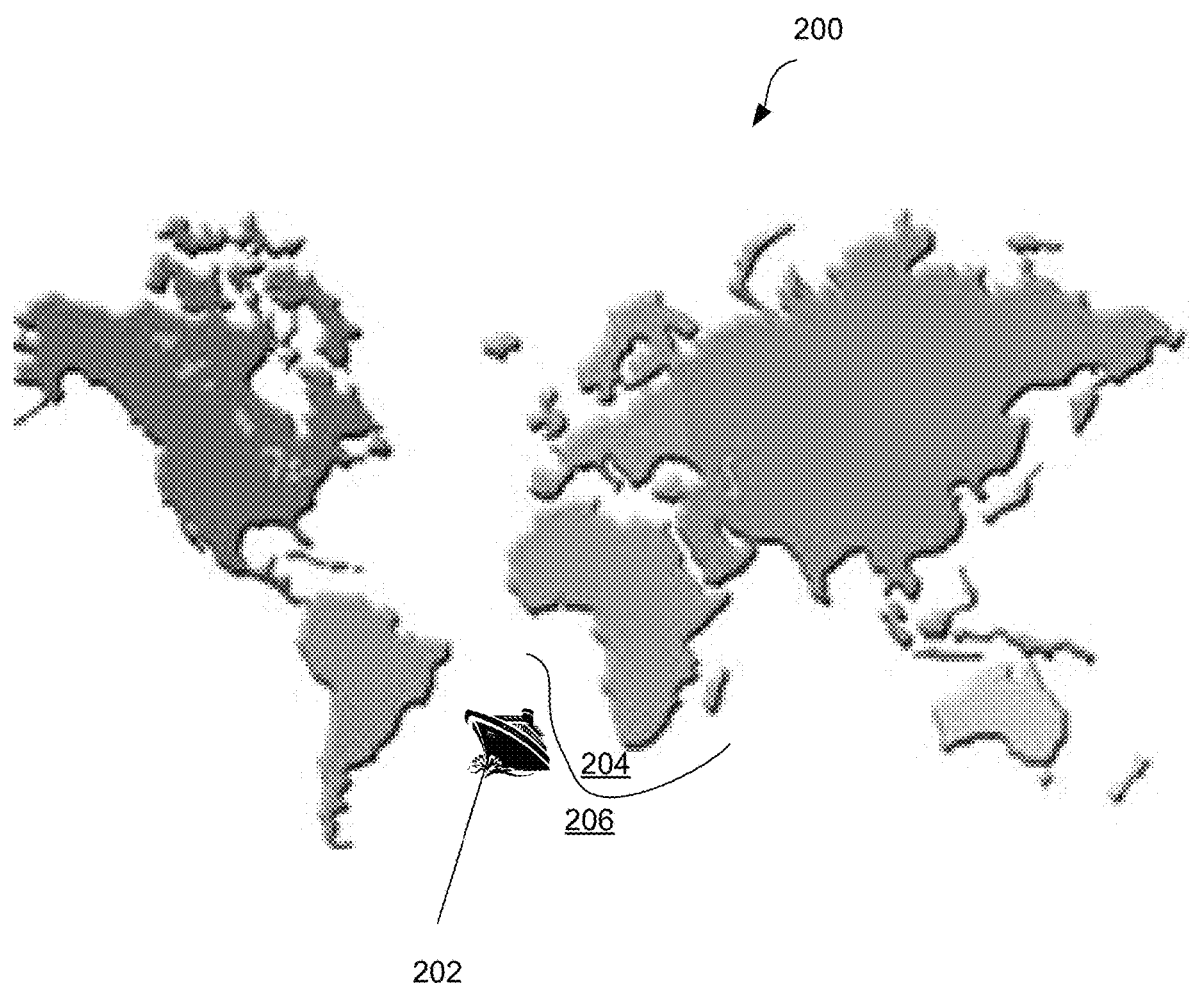
FIG. 2A illustrates an example diagram of a vessel position of a cruise ship.

The mobile gaming management server 102 may obtain location information from the location server 104. The global position server 118 may determine a global vessel position of the vessel. Referring to FIG. 2A, an example diagram of a vessel position of a cruise ship, the global position server may use any location or position determination methods to determine the position of the cruise ship 202. Although example embodiments illustrate the vessel as a cruise ship, this is not intended to be limiting as any vessel may be used such as a riverboat, and any other movable transport device. The cruise ship 202 may be positioned or located in international waters 206 or national waters 204. Thus, the vessel position may be a global position relative to the world 200. As illustrated, the cruise ship 202 is located in international waters 206.

Figure 2B:
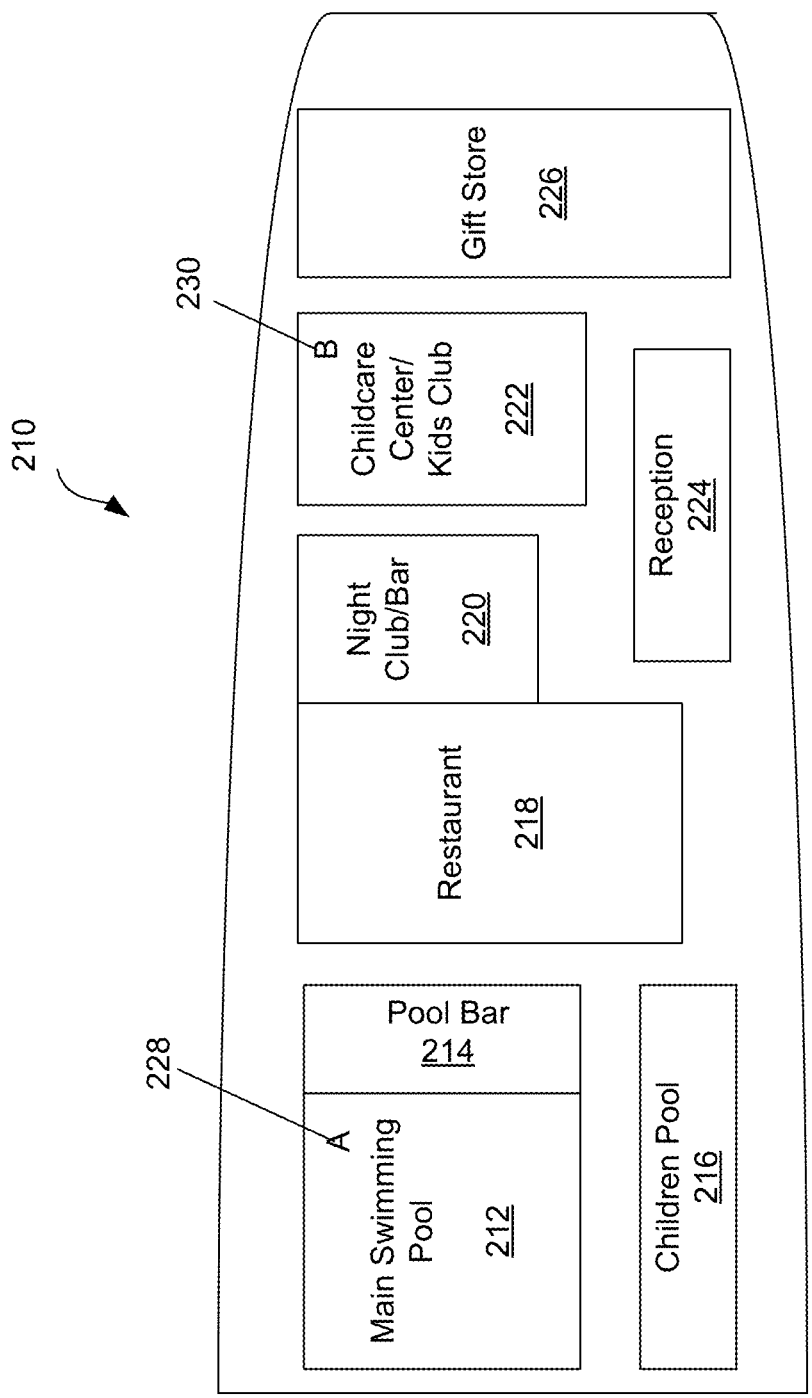
FIG. 2B illustrates an example layout of a cruise ship.

Referring back to FIG. 1, the device position server 120 of the location server 104 may determine a device position of the mobile gaming device 116 relative to the vessel. Referring to FIG. 2B, an example layout of a cruise ship, the cruise ship 210 may have a main pool 212, pool bar 214, children's pool 216, restaurant 218, night club/bar 220, kids club or childcare center 222, reception 224, and gift store 226 on its main deck. Although example embodiments illustrate the vessel as a cruise ship, this is not intended to be limiting as the vessel may be a car, bus, airplane, train, riverboat, and any other movable transport device. Specific gaming areas may be predetermined on the cruise ship 210. For example, games of chance may be played at the main pool 212, pool bar 214, and night club/bar 220 on the main deck. Games of chance may not be permitted to be played at the children's pool 216, restaurant 218, kids club or childcare center 222, reception 224, and gift store 226. In one example, passenger A 228 may want to play a game of chance while lounging at the main pool 212. The location server may determine that the device position of the mobile gaming device is at or around the main pool area 212. In another embodiment, passenger B 230 may want to play a game of chance while at the kids club or childcare center 222. The location server 104 may determine that the device position of the mobile gaming device is at or around the childcare center 222.

Referring back to FIG. 1, once the vessel position and device position are determined, the information may be associated with the mobile gaming device and stored in the location database 113. The mobile gaming management server 102 may request and obtain location information for each mobile gaming device from the location server 104.

Once obtained, the mobile gaming management server 102 may determine whether play of the game of chance is permitted on the mobile gaming device. The determination may be based upon the gaming rules stored in the gaming rules database 114. For example, since passenger A is located at the main pool area where playing games of chance are permitted, the mobile gaming management server 102 may determine that the game of chance may be played on the mobile gaming device 116 of passenger A.

However, since passenger B is located at the childcare center where playing games of chance are not permitted, the request to play the game of chance will be denied. In this embodiment, a denial message may be transmitted to the mobile gaming device of passenger B. The denial message may also include at least one reason for the denial of the transfer fund request. For example, the denial message may display that games are chance are not permitted to be played in the childcare center.

Since passenger A is permitted to play the game of chance, the mobile gaming management server 102 the game of chance may be enabled on the mobile gaming device 116. The gaming server 106 may transmit the requested game of chance to the mobile gaming device 116.

In another embodiment, the mobile gaming management server 102 may also user other criteria to determine whether to permit or deny play of a game of chance. For example, one criterion may be a time rule. A time stamp on the request to play the game of chance may be used to determine whether the game of chance may be played on the mobile gaming device. If the time stamp was at 3 a.m., the game of chance may not be permitted to be played. If the time stamp was at 10 a.m., the game of chance may be permitted to be played. The time rule may also be updated based on different time zones.

In another example, one criterion may be the age of the passenger. If the user information obtained from the passenger main account 122 indicates that the passenger is only 18 years old, based upon certain gaming rules, the game of chance may not be permitted to be played. It will now be appreciated that the mobile gaming management server 102 may use any other desired criteria to determine whether or not to permit play of the game of chance on the mobile gaming device 116.

FIG. 2C illustrates an example gaming rules table. The gaming rules table may be stored, for example, in the gaming rules database 114 illustrated in FIG. 1. The gaming rules table 240 may include criteria used to determine whether to permit play of the game of chance 252 on the mobile gaming device. Each criterion may be associated with a device 242. As illustrated, the criteria may be based on device position 244, vessel position 246, and time 248.

Device 1 254 may be located at the main pool in international waters. A request to play a game of chance may be received at 11 a.m. Based on the device position, vessel position, and time rule, the mobile gaming management server 102 may determine that the game of chance may be played on the mobile gaming device.

Device 2 256 may be located at the childcare center in international waters. A request to play a game of chance may be received at 3 p.m. Based on the device position, vessel position, and time rule, the mobile gaming management server 102 may determine that the game of chance may not be played on the mobile gaming device.

Device 3 258 may be located at the night club in international waters. A request to play a game of chance may be received at 11 p.m. Based on the device position, vessel position, and time rule, the mobile gaming management server 102 may determine that the game of chance may be played on the mobile gaming device.

Figure 3:
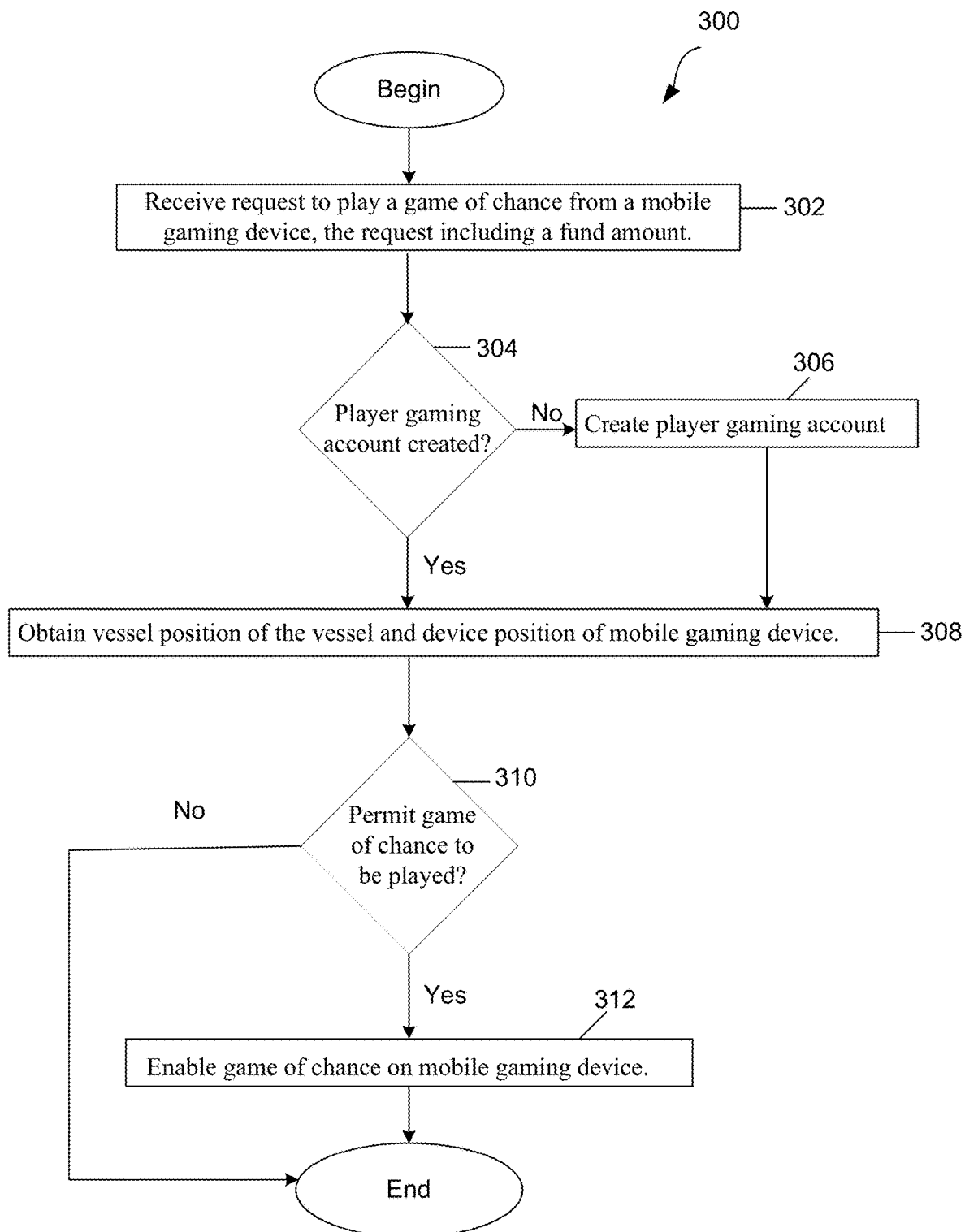
FIG. 3 illustrates an example method for controlling play of a game of a chance on a vessel.

FIG. 3 illustrates an example method for controlling play of a game of a chance on a cruise ship. The method 300 may begin with receiving a request to play a game of chance from a mobile gaming device at 302. The request may be transferred to a gaming server, e.g. such as gaming server 106 illustrated in FIG. 1. The gaming server may transmit the request to an intermediary server, e.g. such as mobile gaming management server 102 illustrated in FIG. 1. The intermediary server may determine whether the passenger has a player gaming account at 304. If the passenger does not have a player gaming account, a player gaming account may be created for the passenger 306.

The intermediary server may obtain a vessel position of the vessel and device position of the mobile gaming device at 308. The vessel position and device position may be obtained from, for example, a location server e.g. such as location server 104 illustrated in FIG. 1. The vessel position of the vessel may be a position relative to the world. The device position of the mobile gaming device may be a position relative to the vessel.

Once obtained, the intermediary server may determine whether to permit or deny play of the game of chance at 310. The determination may be based upon the gaming rules stored in a gaming rules database, e.g. such as gaming rules database 114 illustrated in FIG. 1. In one embodiment, the determination whether to permit or deny play of the game of chance may be based on at least the device position and the vessel position. In another embodiment, the determination whether to transfer permit or deny play of the game of chance may be based on at least time rules, user information, or any other predetermined criteria.

If the intermediary server determines that play of the game of chance is not permitted at 310, the method 300 may end. If the intermediary server determines that play of the game of chance is permitted at 310, the game of chance may be enabled on the mobile gaming device at 312.

Figure 4:
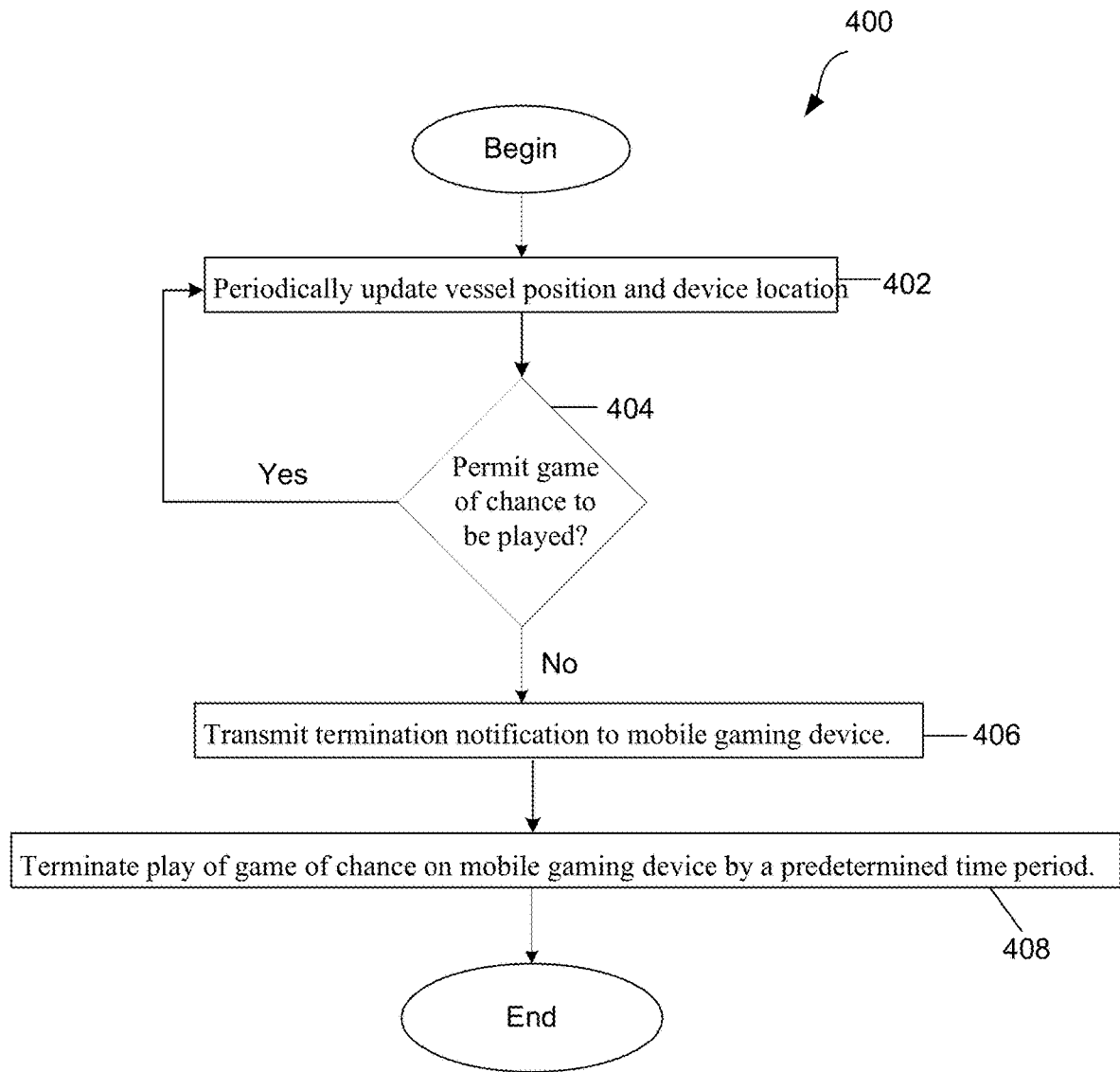
FIG. 4 illustrates another example method for controlling play of a game of a chance on a vessel.

FIG. 4 illustrates another example method for controlling play of a game of a chance on a vessel. The method 400 may begin with the vessel position and device position being periodically updated at 402. The vessel position and device position may be periodically updated by a location server, e.g. such as location server 104 illustrated in FIG. 1. Updating the vessel position and device position ensures that play of the games of chance, are carried out only in allowable areas, environments and times. The intermediary server may determine whether the game of chance may be permitted to be played on the mobile gaming device at 404. In one embodiment, the determination of whether the game of chance may be permitted to be played on the mobile gaming device may be based upon the updated vessel position and updated device position. For example, although the original device position may have been in an area where playing games of chance is permitted, the updated device position may now indicate the mobile gaming device is located at a location where playing games of chance is not permitted. In one embodiment, the determination of whether the game of chance may be permitted to be played on the mobile gaming device may also be based upon an updated time as well. For example, although the time may have been a time when playing games of chance is permitted (e.g. 7 am-3 am), the updated time may now indicate the mobile gaming device is being played at a time when playing games of chance is not permitted (e.g. 3 am-7 am).

If it is determined that the game of chance of is permitted to be played at 404, the method may continue at 402. If it is determined that the game of chance is not permitted to be played at 404, a termination notification may be transmitted to the mobile gaming device at 406. In one embodiment, the termination notification may include at least one reason for termination of the game of chance. For example, the reason for termination may be based on the vessel position. The vessel may be entering into national waters from international waters. In another example, the reason for termination may be because the mobile gaming device entered an unauthorized location where playing games of chance are not permitted. In still another example, the reason for termination may be because the time restriction to end play of the game of chance is imminent. The game of chance may be terminated on the mobile gaming device within a predetermined time period at 408. The predetermined time period may allow the player to complete play of the game of chance, cash out, and perform any other functions prior to ending play of the game of chance.

Figure 5:
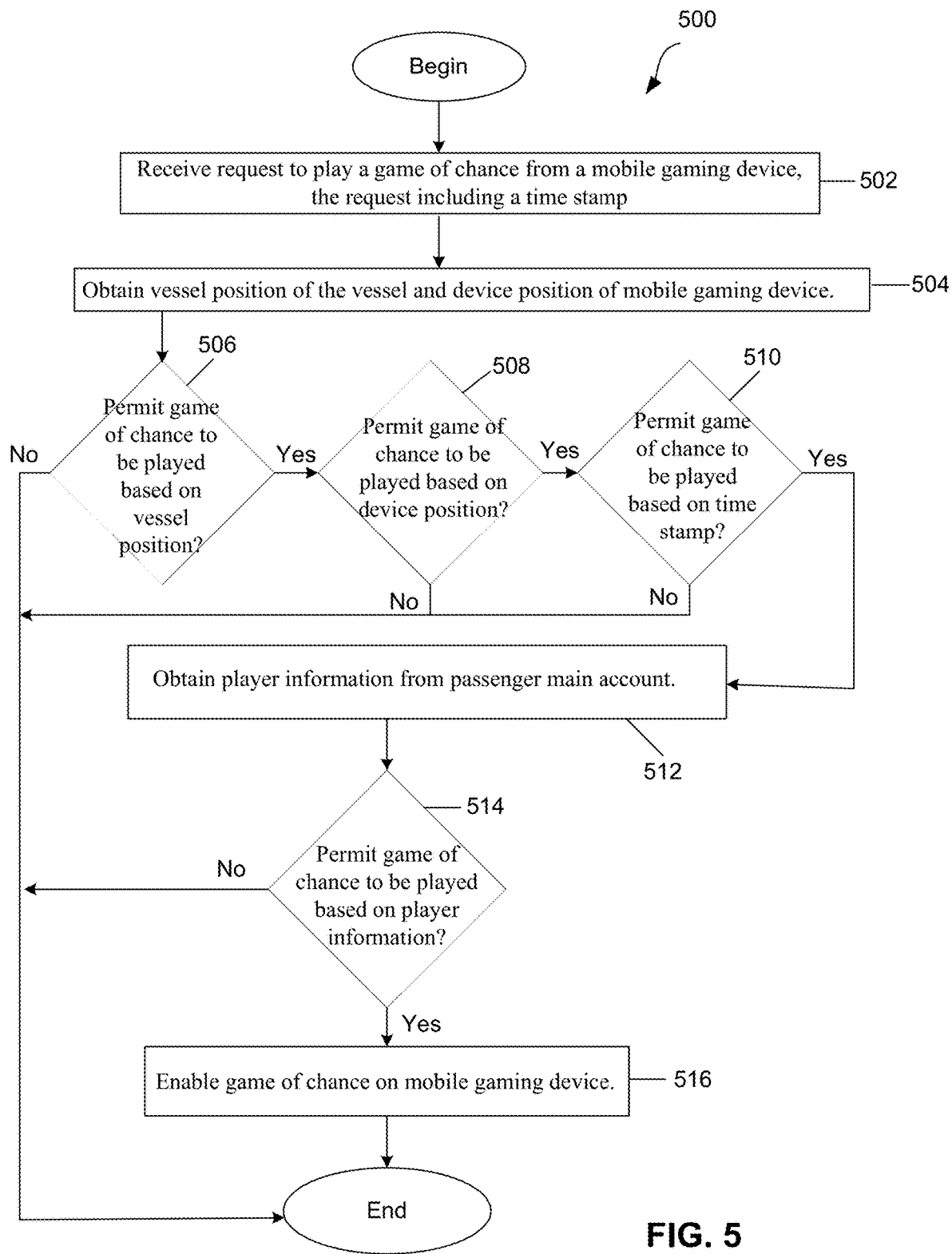
FIG. 5 illustrates another example method for controlling play of a game of a chance on a vessel.

FIG. 5 illustrates another example method for controlling play of a game of a chance on a vessel. The method 500 may begin with receipt of a request to play a game of chance from a mobile gaming device at 502. The request may include a time stamp. The request may be transferred to a gaming server, e.g. such as gaming server 106 illustrated in FIG. 1. The gaming server may transmit the request to an intermediary server, e.g. such as mobile gaming management server 102 illustrated in FIG. 1.

The intermediary server may obtain a vessel position of the vessel and device position of the mobile gaming device at 504. The vessel position and device position may be obtained from a location server, e.g. such as location server 104 illustrated in FIG. 1. The vessel position of the vessel may be a position relative to the world or earth. The device position of the mobile gaming device may be a position relative to the vessel.

Once obtained, the intermediary server may determine whether the game of chance may be played on the mobile gaming device based upon the vessel position at 506. If it is determined that the game of chance may not be played on the mobile gaming device based upon the vessel position at 506, the method 500 may end. If it is determined that the game of chance may be played on the mobile gaming device based upon the vessel position at 506, a determination of whether the game of chance may be played on the mobile gaming device based upon the device position at 508.

If it is determined that the game of chance may not be played on the mobile gaming device based upon the device position at 508, the method 500 may end. If it is determined that the game of chance may be played on the mobile gaming device based upon the device position at 508, a determination of whether the game of chance may be played on the mobile gaming device based upon the time stamp at 510. If it is determined that the game of chance may not be played on the mobile gaming device based upon the time stamp at 510, the method 500 may end.

If it is determined that the game of chance may be played on the mobile gaming device based upon the time stamp at 510, passenger information (e.g. username and password, date of birth, and any other player information) may be obtained from the passenger main account at 512. A determination of whether to permit the game of chance to be played on the mobile gaming device based on player information may be made at 514. The determination of whether the game of chance may be played on the mobile gaming device based upon the vessel position, device position, time stamp, or passenger information may be similar to the determination described above with respect to FIGS. 1, 2A, 2B, 3 and 4.

If it is determined that the game of chance may be played on the mobile gaming device based on passenger information at 514, the game of chance may be enabled on the mobile gaming device at 516.

Figure 6:
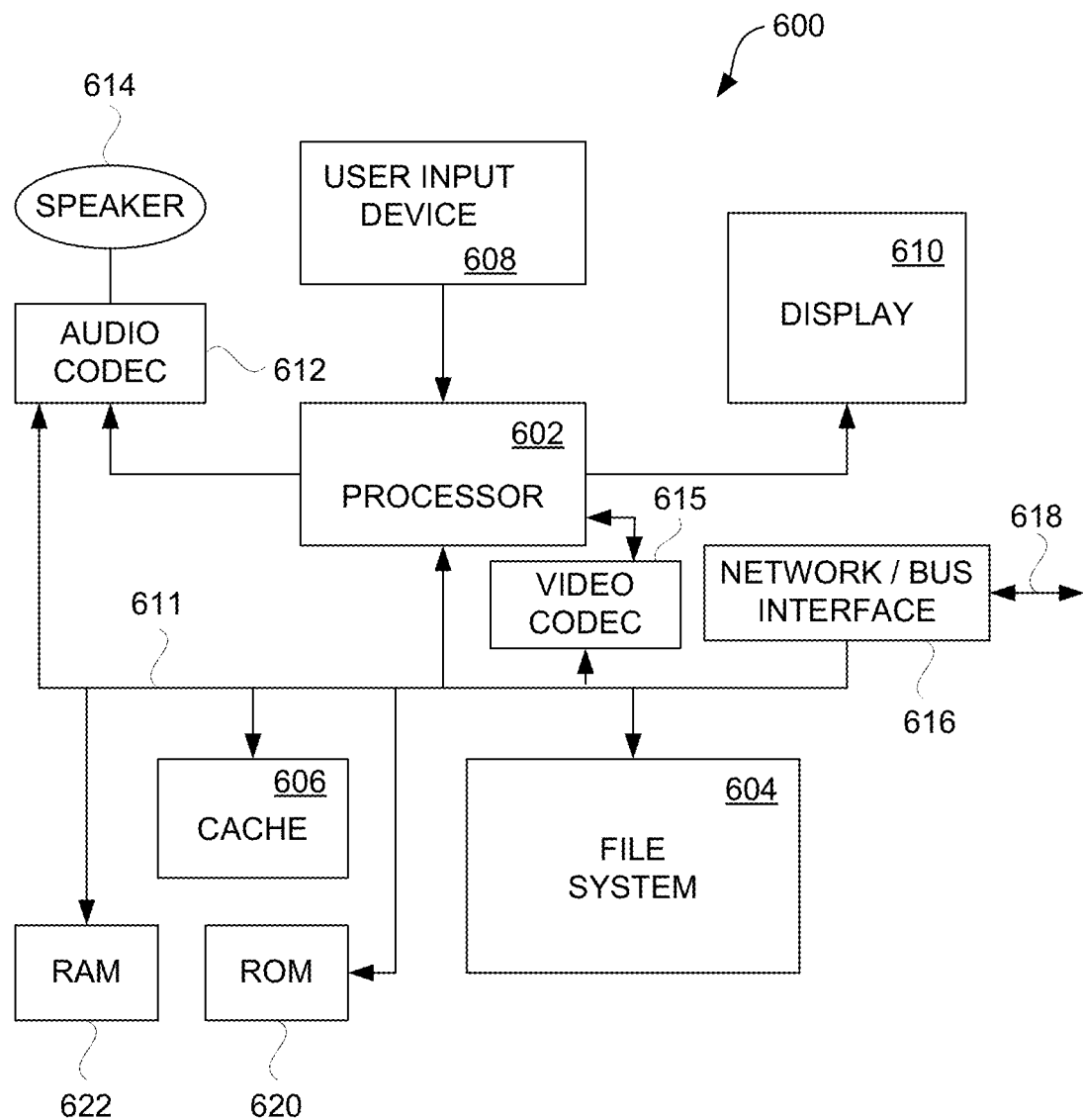
FIG. 6 illustrates an example block diagram of a computing device.

FIG. 6 illustrates an example block diagram of a computing device. The computing device 600 can represent circuitry of a representative computing device (e.g. mobile gaming device, mobile gaming device management sever, location server, cruise ship server, gaming server) described and illustrated in FIG. 1. The computing device can be designed to primarily stationary or can be portable.

The computing device 600 includes a processor 602 that pertains to a microprocessor or controller for controlling the overall operation of the computing device 600. The computing device 600 stores data pertaining to passengers, products and services, location, and the like in a file system 604 and a cache 606. The file system 604 is, typically, semiconductor memory (e.g., Flash memory) and/or one or more storage disks. The file system 604 typically provides high capacity storage capability for the computing device 600. However, since the access time to the file system 604 can be relatively slow, the computing device 600 can also include the cache 606. The cache 606 is, for example, Random-Access Memory (RAM). The relative access time to the cache 606 is typically shorter than for the file system 604. However, the cache 606 does not have the large storage capacity of the file system 604. The computing device 600 also includes a RAM 620 and a Read-Only Memory (ROM) 622. The ROM 622 can store programs, utilities or processes to be executed in a non-volatile manner. The RAM 620 provides volatile data storage, such as for the cache 606.

The computing device 600 may also include a user input device 608 that allows a user of the computing device 600 to interact with the computing device 600. For example, the user input device 608 can take a variety of forms, such as a button, keypad, dial, touch-sensitive surface, joystick, and the like. Still further, the computing device 600 includes a display 610 (screen display) that can be controlled by the processor 602 to display information to the user. A data bus 611 can facilitate data transfer between at least the file system 604, the cache 606, the processor 602, an audio coder/decoder (CODEC) 612 and/or a video CODEC 615.

In one embodiment, for example, if the computing device 600 (e.g. mobile gaming device 116, cruise ship server 108, mobile gaming management server 102, location server 104, gaming server 106 illustrated in FIG. 1) is a mobile gaming device, the computing device 600 may store a plurality of games of chance in the file system 604. When a user desires to have the computing device play a particular game of chance, a list of available games of chance is displayed on the display 610. Then, using the user input device 608, a user can select one of the games of chance to play. The processor 602, upon receiving a selection of a particular media item, supplies the game of chance data to one or more appropriate output devices. If the particular media item is encrypted, the particular media item is first decrypted as noted above, which could involve one or more layers of encryption. As an example, for audio output, the processor 602 can supply the media data (e.g., audio file) for the particular media item to the audio CODEC 612. The audio CODEC 612 can then produce analog output signals for a speaker 614. The speaker 614 can be a speaker internal to the computing device 600 or external to the computing device 600. For example, headphones or earphones that connect to the computing device 600 would be considered an external speaker. As another example, for video output, the processor 602 can supply the media data (e.g., video file) for the particular media item to the video CODEC 615. The video CODEC 615 can then produce output signals for the display 610 and/or the speaker 614.

The computing device 600 also includes a network/bus interface 616 that couples to a data link 618. The data link 618 allows the computing device 600 to couple to another device (e.g., a host computer, a power source, or an accessory device). The data link 618 can be provided over a wired connection or a wireless connection. In the case of a wireless connection, the network/bus interface 616 can include a wireless transceiver.

The various aspects, features, embodiments or implementations of the invention described above can be used alone or in various combinations. Embodiments of the invention can, for example, be implemented by software, hardware, or a combination of hardware and software. Embodiments of the invention can also be embodied as computer readable code on a computer readable medium. The computer readable medium is any data storage device that can store data, which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

In the foregoing description, reference to "one embodiment", "an embodiment", "one example" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

What is claimed is:

1. A system for controlling mobile gaming a plurality of mobile gaming devices while on a vehicle, each of the plurality of mobile gaming devices associated with a player, each of the plurality of mobile gaming devices having a wireless transceiver, the system comprising:
   at least one server provided on the vehicle and operable to:
      receive data from one or more of the mobile gaming devices;
      determine if at least one of the plurality of mobile gaming devices is located on the vehicle based on the received data from the one or more of the mobile gaming devices;
      receive vehicle position data pertaining to a vehicle position, the vehicle position being a global location relative to earth; and
      determine if the vehicle position is located in at least one game play geographic region; and
      permit a game of chance to be played on the at least one of the plurality of mobile gaming devices if (i) the vehicle position is determined to be located in at least one game play geographic region and (ii) the at least one of the plurality of mobile gaming devices is determined to be located on the vehicle.

2. A system as recited in claim 1, wherein the at least one server is operable to:
   periodically update the vehicle position.

3. A system as recited in claim 2, wherein the at least one server is operable to:
   determine whether the game of chance is permitted to be played on each of the plurality of mobile gaming devices based on at least the updated vehicle position; and
   automatically terminate the game of chance currently played on each of the plurality of mobile gaming devices if it is determined that the game of chance is not permitted to be played on each of the plurality of mobile gaming devices based on at least the updated vehicle position.

4. A system as recited in claim 1, wherein the at least one server is operable to:
   determine whether the game of chance is permitted to be played on the at least one of the plurality of mobile gaming devices based on a predefined time rule; and
   enable the game of chance on the at least one of the plurality of mobile gaming devices if it is determined that the game of chance is permitted to be played based on the predefined time rule.

5. A system as recited in claim 1, wherein the at least one server is operable to:
   determine whether the game of chance is permitted to be played on the at least one of the plurality of mobile gaming devices based on player information; and
   enable the game of chance to be played on the at least one of the plurality of mobile gaming devices if it is determined that the game of chance is permitted to be played based on the player information.

6. A system as recited in claim 1, wherein said computer readable medium comprises:
   authenticate a player of at least one of the plurality of mobile gaming devices using a biometric verification.

7. A system as recited in claim 1, wherein the game of chance to be played in accordance with gaming rules, and wherein the at least one server is operable to:
   access a gaming rules database to acquire the gaming rules to be used with the game of chance.

8. A system as recited in claim 7, wherein the gaming rules database includes at least a plurality of predetermined gaming regions and at least one gaming rule that is dependent on the one of the predetermined gaming regions.

9. A system as recited in claim 1, wherein the at least one server is operable to:
   communicate with a player database configured to store player information about a plurality of players, including the players of the plurality of mobile gaming devices; and
   individually control whether each of the plurality of mobile gaming devices is permitted to play the game of chance based on the stored player information in the player database.

10. A method for controlling mobile gaming on a vehicle, comprising:
    obtaining a vehicle position of the vehicle;
    determining if the vehicle position is located in a game play geographic region;
    obtaining a device position of at least one of a plurality of mobile gaming devices;
    determining if at least one of the plurality of mobile gaming devices is located on the vehicle based on the device position for the at least one of the plurality of mobile gaming devices corresponding thereto;
    receiving a request to play a game of chance from at least one of the plurality of mobile gaming devices; and
    enabling the game of chance to be played on the at least one of the plurality of mobile gaming devices if the determining determines that the vehicle position is located in a game play geographic region, and the determining determines that the at least one of the plurality of mobile gaming devices is located on the vehicle based on the device position.

11. A method as recited in claim 10, wherein the method comprises:
    authenticating a player of at least one of the plurality of mobile gaming devices using a biometric verification.

12. A method as recited in claim 11, wherein the game of chance to be played in accordance with gaming rules, wherein the method comprises:
    accessing a gaming rules database to acquire the gaming rules to be used with the game of chance, and
    wherein the gaming rules database includes at least a plurality of predetermined gaming regions and at least one gaming rule that is dependent on the one of the predetermined gaming regions.

13. A method as recited in claim 11, wherein the method comprises:
    communicating with a player database configured to store player information about a plurality of players, including the players of the plurality of mobile gaming devices; and
    individually controlling whether each of the plurality of mobile gaming devices is permitted to play the game of chance based on the stored player information in the player database.

14. A computer readable medium executable computer program code stored thereon for controlling mobile gaming on or in a vehicle, said computer readable medium comprising:
    computer program code for obtaining a vehicle position of the vehicle;
    computer program code for determining if the vehicle position is located in a game play geographic region;
    computer program code for obtaining a device position of at least one of a plurality of mobile gaming devices;
    computer program code for determining if at least one of the plurality of mobile gaming devices is located at or on the vehicle based on the device position for the at least one of the plurality of mobile gaming devices corresponding thereto;
    computer program code for receiving a request to play a game of chance from at least one of the plurality of mobile gaming devices; and
    computer program code for enabling the game of chance to be played on the at least one of the plurality of mobile gaming devices if the computer program code for determining determines that the vehicle position is located in a game play geographic region, and the computer program code for determining determines that the at least one of the plurality of mobile gaming devices is located at or on the vehicle based on the device position.

15. A computer readable medium as recited in claim 14, wherein the vehicle is a vessel.

16. A computer readable medium as recited in claim 15, wherein the vessel is a cruise ship.

17. A computer readable medium as recited in claim 14, wherein said computer readable medium comprises:
    computer program code for periodically updating the vehicle position.

18. A computer readable medium as recited in claim 17, wherein said computer readable medium comprises:
    computer program code for determining whether the game of chance is permitted to be played on each of the plurality of mobile gaming devices based on at least the updated vehicle position; and
    computer program code for automatically terminating the game of chance currently played on each of the plurality of mobile gaming devices if the computer program code for determining determines that the game of chance is not permitted to be played on each of the plurality of mobile gaming devices based on at least the updated vehicle position.

19. A computer readable medium as recited in claim 14, wherein said computer readable medium comprises:
computer program code for determining whether the game of chance is permitted to be played on the at least one of the plurality of mobile gaming devices based on a predefined time rule; and
computer program code for enabling the game of chance on the at least one of the plurality of mobile gaming devices if the computer program code for determining determines that the game of chance is permitted to be played based on the predefined time rule.

20. A computer readable medium as recited in claim 14, wherein said computer readable medium comprises:
computer program code for determining whether the game of chance is permitted to be played on the at least one of the plurality of mobile gaming devices based on player information; and
computer program code for enabling the game of chance to be played on the at least one of the plurality of mobile gaming devices if the computer program code for determining determines that the game of chance is permitted to be played based on the player information.

21. A computer readable medium as recited in claim 14, wherein said computer readable medium comprises:
computer program code for authenticating a player of at least one of the plurality of mobile gaming devices using a biometric verification.

22. A computer readable medium as recited in claim 14, wherein the game of chance to be played in accordance with gaming rules, and
wherein said computer readable medium comprises:
computer program code for accessing a gaming rules database to acquire the gaming rules to be used with the game of chance.

23. A computer readable medium as recited in claim 22, wherein the gaming rules database includes at least a plurality of predetermined gaming regions and at least one gaming rule that is dependent on the one of the predetermined gaming regions.

24. A computer readable medium as recited in claim 14, wherein said computer readable medium comprises:
computer program code for communicating with a player database configured to store player information about a plurality of players, including the players of the plurality of mobile gaming devices.

25. A computer readable medium as recited in claim 24, wherein said computer readable medium comprises:
computer program code for individually controlling whether each of the plurality of mobile gaming devices is permitted to play the game of chance based on the stored player information in the player database.

* * * * *